US012545266B2

(12) United States Patent
Weicker et al.

(10) Patent No.: US 12,545,266 B2
(45) Date of Patent: Feb. 10, 2026

(54) OPERATING COMMERCIAL VEHICLES USING WEIGHT ESTIMATES

(71) Applicant: Harbinger Motors Inc., Garden Grove, CA (US)

(72) Inventors: Phillip John Weicker, Los Angeles, CA (US); John Henry Harris, III, Anaheim, CA (US); William Clarke Eberts, Los Angeles, CA (US); Jackson George Diebel, Hermosa Beach, CA (US); Richard D. Walker, IV, Los Angeles, CA (US); Jue Wang, Temple City, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 195 days.

(21) Appl. No.: 18/186,048

(22) Filed: Mar. 17, 2023

(65) Prior Publication Data

US 2023/0227047 A1    Jul. 20, 2023

Related U.S. Application Data

(63) Continuation-in-part of application No. 17/655,199, filed on Mar. 17, 2022, now abandoned.
(Continued)

(51) Int. Cl.
*B60W 40/13* (2012.01)
*B60W 10/18* (2012.01)
(Continued)

(52) U.S. Cl.
CPC ............ *B60W 40/13* (2013.01); *B60W 10/18* (2013.01); *B60W 10/22* (2013.01); *B60W 30/18127* (2013.01); *B60W 2540/12* (2013.01)

(58) Field of Classification Search
None
See application file for complete search history.

(56) References Cited

U.S. PATENT DOCUMENTS

| 7,024,291 B2 | 4/2006 | Sudou |
| 9,725,093 B2 | 8/2017 | Chunodkar et al. |

(Continued)

FOREIGN PATENT DOCUMENTS

WO     2015004639 A2    1/2015

OTHER PUBLICATIONS

International Application Serial No. PCT/US23/1555, Written Opinion and Search Report mailed Jul. 7, 2023, 9 pgs.
(Continued)

*Primary Examiner* — Lail A Kleinman
(74) *Attorney, Agent, or Firm* — Polygon IP, LLP

(57) ABSTRACT

Described herein are methods and systems for the weight estimation of commercial vehicles and using these estimates to control different vehicle systems such as powertrain, brakes, and suspension. A vehicle comprises a weight estimator, which receives input from different vehicle systems and/or sensors (e.g., suspension, powertrain, speedometer, tire pressure monitoring system) and uses these inputs to determine weight values associated with the vehicle (e.g., total weight, weight distribution per axle, weight distribution per wheel, load distribution). These weight values are then used by the power train, brakes, and/or suspension as additional input for operating these systems besides drivers' input, e.g., provided as pedal positions. For example, different weight values can cause different powertrain outputs for the same accelerator pedal position, e.g., greater output for a heavier vehicle. As such, a driver experiences more uniform vehicle responses for different vehicle loads.

20 Claims, 19 Drawing Sheets

Related U.S. Application Data

(60) Provisional application No. 63/269,483, filed on Mar. 17, 2022, provisional application No. 63/271,005, filed on Oct. 22, 2021.

(51) Int. Cl.
*B60W 10/22* (2006.01)
*B60W 30/18* (2012.01)

(56) References Cited

U.S. PATENT DOCUMENTS

| | | | |
|---|---|---|---|
| 11,618,459 B1* | 4/2023 | Fujii | B60W 50/14 |
| | | | 701/68 |
| 11,685,301 B2 | 6/2023 | Eberts et al. | |
| 11,708,060 B2* | 7/2023 | Yard | B60W 10/08 |
| | | | 701/22 |
| 11,900,330 B1* | 2/2024 | Brannan | G07C 5/006 |
| 12,162,485 B2* | 12/2024 | Rajala | B60W 40/107 |
| 2005/0065695 A1 | 3/2005 | Grieser | |
| 2010/0049415 A1 | 2/2010 | Bauerle | |
| 2012/0108384 A1* | 5/2012 | Tabata | B60L 15/20 |
| | | | 180/65.265 |
| 2013/0138288 A1 | 5/2013 | Nickolaou et al. | |
| 2016/0368493 A1 | 12/2016 | Driscall et al. | |
| 2017/0225535 A1 | 8/2017 | Batsch et al. | |
| 2018/0105172 A1 | 4/2018 | Gesch et al. | |
| 2018/0180168 A1 | 6/2018 | Peterson et al. | |
| 2018/0194357 A1* | 7/2018 | Hall | B60K 35/28 |
| 2019/0180528 A1 | 6/2019 | Hall et al. | |
| 2020/0055521 A1* | 2/2020 | Pearson | B60W 40/13 |
| 2020/0247423 A1 | 8/2020 | Almahmoud et al. | |
| 2021/0009138 A1* | 1/2021 | Janampally | B60W 40/06 |
| 2021/0048333 A1* | 2/2021 | Zhang | B60T 7/18 |
| 2021/0086731 A1* | 3/2021 | Osterhoff | B60T 8/172 |
| 2021/0179116 A1 | 6/2021 | Bullock et al. | |
| 2021/0300380 A1* | 9/2021 | Harada | B60L 15/2009 |
| 2022/0041172 A1 | 2/2022 | Jundt et al. | |
| 2022/0189215 A1* | 6/2022 | Erkkilä | B60W 50/0205 |
| 2022/0203957 A1* | 6/2022 | Yanase | B60W 10/02 |
| 2022/0234598 A1 | 7/2022 | Hägele et al. | |
| 2023/0122078 A1 | 4/2023 | Eberts et al. | |
| 2023/0128284 A1 | 4/2023 | Weicker et al. | |
| 2023/0286347 A1* | 9/2023 | Zhao | B60G 17/018 |
| 2023/0406058 A1* | 12/2023 | Ishibashi | B60G 17/06 |
| 2024/0075934 A1* | 3/2024 | Jundt | B60W 10/10 |
| 2024/0181831 A1* | 6/2024 | Guy | B60G 17/06 |
| 2024/0336133 A1* | 10/2024 | Summers | B60W 30/146 |

OTHER PUBLICATIONS

U.S. Appl. No. 17/655,199, Advisory Action mailed Jan. 18, 2023, 3 pgs.
U.S. Appl. No. 17/655,199, Final Office Action mailed Sep. 30, 2022, 30 pgs.
U.S. Appl. No. 17/655,199, Non Final Office Action mailed May 26, 2022, 20 pgs.
U.S. Appl. No. 17/655,199, Non Final Office Action mailed Mar. 2, 2022, 35 pgs.
Gonderman, "What are Hydraulic Bump Stops?," Sep. 11, 2020, https://www.motortrend.com/how-to/what-are-hydraulic-bump-stops/.

* cited by examiner

OPERATING COMMERCIAL VEHICLES USING WEIGHT ESTIMATES

CROSS-REFERENCE TO RELATED APPLICATIONS

This application claims the benefit under 35 U.S.C. § 119(e) of U.S. Provisional Patent Application No. 63/269,483, filed on Mar. 17, 2022, and a continuation-in-part of U.S. patent application Ser. No. 17/655,199, filed on Mar. 17, 2022, which claims the benefit under 35 U.S.C. § 119(e) of U.S. Provisional Patent Application No. 63/271,005, filed on Oct. 22, 2021, all of which are incorporated herein by reference in their entireties for all purposes.

BACKGROUND

Commercial vehicles can experience major weight changes, e.g., between an empty vehicle and a fully-loaded vehicle. For example, in the US, a semi-truck without a trailer can weigh about 25,000 pounds, while the same semi-truck with a loaded trailer can weigh up to 80,000 pounds. The weight has a significant impact on the vehicle's operation, e.g., driving dynamics, vehicle stability, braking, fuel consumption, and the like. One will readily understand that a fully-loaded vehicle can take much longer to accelerate and brake. At the same time, various systems (e.g., power train, braking, and suspension) of conventional commercial vehicles are typically tuned for one specific target weight without any specific provisions for weight changes. Operating a vehicle outside of this target weight is quite common but, at the same time, is suboptimal and often requires special skills and training from the driver. As such, operating many commercial vehicles, especially large and heavy commercial vehicles, requires special licenses. On the other hand, there is a huge demand for commercial drivers, especially for drivers performing last-mile deliveries. At the same time, integrating various weight control systems into vehicles is difficult. For example, load cells/strain gauges used for measuring forces experienced by various chassis components can be expensive and/or susceptible to disturbances (e.g., vibrations caused by vehicle operations).

What is needed are new methods and systems for estimating the current weight of commercial vehicles and utilizing this information for operating such vehicles, e.g., to assist drivers and improve the driving experience such as having a more consistent "pedal feel" despite changes in the vehicle weight.

SUMMARY

Described herein are methods and systems for the weight estimation of commercial vehicles and using these estimates to control different vehicle systems such as powertrain, brakes, and suspension. A vehicle comprises a weight estimator, which receives input from different vehicle systems and/or sensors (e.g., suspension, powertrain, speedometer, tire pressure monitoring system) and uses these inputs to determine weight values associated with the vehicle (e.g., total weight, weight distribution per axle, weight distribution per wheel, load distribution). These weight values are then used by the power train, brakes, and/or suspension as additional input for operating these systems besides drivers' input, e.g., provided as pedal positions. For example, different weight values can cause different powertrain outputs for the same accelerator pedal position, e.g., greater output for a heavier vehicle. As such, a driver experiences more uniform vehicle responses for different vehicle loads.

In some aspects, the techniques described herein relate to a method of operating a commercial vehicle including a drive train controller and a drive train, the method including: receiving one or more vehicle weight values at the drive train controller; receiving a throttle pedal position at the drive train controller; determining one or more torque commands based on the one or more vehicle weight values and the throttle pedal position, wherein the one or more torque commands are determined at the drive train controller and using a throttle map; and transmitting the one or more torque commands from the drive train controller to the drive train.

In some aspects, the techniques described herein relate to a method, further including receiving one or more additional inputs at the drive train controller, wherein: the one or more additional inputs are selected from the group consisting of vehicle speed, road grade, wheel-road traction, and vehicle dynamic selection; and the one or more torque commands are further determined based on the one or more additional inputs.

In some aspects, the techniques described herein relate to a method, further including: receiving, at a weight estimator, one or more inputs selected from the group consisting of a wheel travel value, a bump stop output, a speed value, a power train data, a trailer presence data, and a tire pressure value; and determining, using the weight estimator, the one or more weight values corresponding to the commercial vehicle based on the one or more inputs, wherein the drive train controller receives the one or more vehicle weight values from the weight estimator.

In some aspects, the techniques described herein relate to a method, wherein determining the one or more weight values is performed using one or m In some aspects, the techniques described herein relate to a method of operating a commercial vehicle including a drive train controller and a drive train, the method including: receiving one or more vehicle weight values at the drive train controller; receiving a throttle pedal position at the drive train controller; determining one or more torque commands based on the one or more vehicle weight values and the throttle pedal position, wherein the one or more torque commands are determined at the drive train controller and using a throttle map; and transmitting the one or more torque commands from the drive train controller to the drive train. In some aspects, the techniques described herein relate to a method, further including receiving one or more additional inputs at the drive train controller, wherein: the one or more additional inputs are selected from the group consisting of vehicle speed, road grade, wheel-road traction, and vehicle dynamic selection; and the one or more torque commands are further determined based on the one or more additional inputs. In some aspects, the techniques described herein relate to a method, further including: receiving, at a weight estimator, one or more inputs selected from the group consisting of a wheel travel value, a bump stop output, a speed value, a power train data, a trailer presence data, and a tire pressure value; and determining, using the weight estimator, the one or more weight values corresponding to the commercial vehicle based on the one or more inputs, wherein the drive train controller receives the one or more vehicle weight values from the weight estimator. In some aspects, the techniques described herein relate to a method, wherein determining the one or more weight values is performed using one or more correlation techniques of weight values and input values. In some aspects, the techniques described herein relate to a method, wherein each of the one or more weight values is performed using multiple ones of the one or more inputs. In some aspects, the techniques described herein relate to a method, further including: determining a target acceleration based on the throttle pedal position; receiving a measured acceleration; and comparing the target acceleration with the measured vehicle acceleration to determine an acceleration difference, wherein the one or more torque commands are further determined based on the acceleration difference. In some aspects, the techniques described herein relate to a method, wherein the target acceleration is offset by a power train response delay when compared with the measured acceleration. In some aspects, the techniques described herein relate to a method, wherein the one or more vehicle weight values include multiple weight values, representing weight distribution at different locations of the vehicle. In some aspects, the techniques described herein relate to a method, wherein the one or more torque commands includes multiple torque commands, each corresponding to a different driver motor of the drive train. In some aspects, the techniques described herein relate to a method, further including: receiving the one or more vehicle weight values at a braking controller of the commercial vehicle; receiving a brake pedal position at the braking controller; determining brake commands based on the one or more vehicle weight values and the brake pedal position, wherein the brake commands are determined at the braking controller and using a brake map; and transmitting the brake commands from the braking controller to brakes of the commercial vehicle. In some aspects, the techniques described herein relate to a method, further including determining one or more regenerative commands based on the one or more vehicle weight values and the brake pedal position. In some aspects, the techniques described herein relate to a method, wherein the brake commands is determined at least in part based on the regenerative commands. In some aspects, the techniques described herein relate to a method, further including receiving one or more additional inputs at the brake controller, wherein: the one or more additional inputs are selected from the group consisting of vehicle speed, road grade, wheel-road traction, and vehicle dynamic selection; and the one or more brake commands are further determined based on the one or more additional inputs. In some aspects, the techniques described herein relate to a method, further including: determining a target deceleration based on the brake pedal position; receiving a measured deceleration; and comparing the target deceleration with the measured deceleration to determine a deceleration difference, wherein the one or more brake commands are further determined based on the deceleration difference. In some aspects, the techniques described herein relate to a method, wherein the one or more vehicle weight values includes multiple weight values, representing weight distribution at different locations of the vehicle. In some aspects, the techniques described herein relate to a method, further including: receiving the one or more vehicle weight values at a suspension controller of the commercial vehicle; determining one or more suspension commands based on the one or more vehicle weight values, wherein the one or more suspension commands are determined at the suspension controller and using a suspension map; and transmitting the one or more suspension commands from the suspension controller to a suspension system of the commercial vehicle. In some aspects, the techniques described herein relate to a method, further including receiving one or more additional inputs at the suspension controller, wherein: the one or more additional inputs are selected from the group consisting of vehicle speed, road grade, wheel-road traction, and vehicle dynamic selection; and the one or more suspension commands are further determined based on the one or more additional inputs. In some aspects, the techniques described herein relate to a method, wherein the one or more vehicle weight values includes multiple weight values, representing weight distribution at different locations of the vehicle. In some aspects, the techniques described herein relate to a method, wherein the suspension map includes one or more suspension firmness profiles, such that in each of the one or more suspension firmness profiles, the suspension firmness is a function of the vehicle weight. In some aspects, the techniques described herein relate to a method, wherein the suspension map includes multiple suspension firmness profiles, such that in each of the multiple suspension firmness profiles, the suspension firmness is a function of the vehicle weight, and each of the multiple suspension firmness profiles corresponds to a different operating condition of the vehicle.

In some aspects, the techniques described herein relate to a method, wherein each of the one or more weight values is performed using multiple ones of the one or more inputs.

In some aspects, the techniques described herein relate to a method, further including: determining a target acceleration based on the throttle pedal position; receiving a measured acceleration; and comparing the target acceleration with the measured vehicle acceleration to determine an acceleration difference, wherein the one or more torque commands are further determined based on the acceleration difference.

In some aspects, the techniques described herein relate to a method, wherein the target acceleration is offset by a power train response delay when compared with the measured acceleration.

In some aspects, the techniques described herein relate to a method, wherein the one or more vehicle weight values include multiple weight values, representing weight distribution at different locations of the vehicle.

In some aspects, the techniques described herein relate to a method, wherein the one or more torque commands includes multiple torque commands, each corresponding to a different driver motor of the drive train.

In some aspects, the techniques described herein relate to a method, further including: receiving the one or more vehicle weight values at a braking controller of the commercial vehicle; receiving a brake pedal position at the braking controller; determining brake commands based on the one or more vehicle weight values and the brake pedal position, wherein the brake commands are determined at the braking controller and using a brake map; and transmitting the brake commands from the braking controller to brakes of the commercial vehicle.

In some aspects, the techniques described herein relate to a method, further including determining one or more regenerative commands based on the one or more vehicle weight values and the brake pedal position.

In some aspects, the techniques described herein relate to a method, wherein the brake commands is determined at least in part based on the regenerative commands.

In some aspects, the techniques described herein relate to a method, further including receiving one or more additional inputs at the brake controller, wherein: the one or more additional inputs are selected from the group consisting of vehicle speed, road grade, wheel-road traction, and vehicle dynamic selection; and the one or more brake commands are further determined based on the one or more additional inputs.

In some aspects, the techniques described herein relate to a method, further including: determining a target deceleration based on the brake pedal position; receiving a measured deceleration; and comparing the target deceleration with the measured deceleration to determine a deceleration difference, wherein the one or more brake commands are further determined based on the deceleration difference.

In some aspects, the techniques described herein relate to a method, wherein the one or more vehicle weight values includes multiple weight values, representing weight distribution at different locations of the vehicle.

In some aspects, the techniques described herein relate to a method, further including: receiving the one or more vehicle weight values at a suspension controller of the commercial vehicle; determining one or more suspension commands based on the one or more vehicle weight values, wherein the one or more suspension commands are determined at the suspension controller and using a suspension map; and transmitting the one or more suspension commands from the suspension controller to a suspension system of the commercial vehicle.

In some aspects, the techniques described herein relate to a method, further including receiving one or more additional inputs at the suspension controller, wherein: the one or more additional inputs are selected from the group consisting of vehicle speed, road grade, wheel-road traction, and vehicle dynamic selection; and the one or more suspension commands are further determined based on the one or more additional inputs.

In some aspects, the techniques described herein relate to a method, wherein the one or more vehicle weight values includes multiple weight values, representing weight distribution at different locations of the vehicle.

In some aspects, the techniques described herein relate to a method, wherein the suspension map includes one or more suspension firmness profiles, such that in each of the one or more suspension firmness profiles, the suspension firmness is a function of the vehicle weight.

In some aspects, the techniques described herein relate to a method, wherein the suspension map includes multiple suspension firmness profiles, such that in each of the multiple suspension firmness profiles, the suspension firmness is a function of the vehicle weight, and each of the multiple suspension firmness profiles corresponds to a different operating condition of the vehicle.

These and other embodiments are described further below with reference to the figures.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

As noted above, commercial vehicles can experience major weight changes during their operation. For example, trucks can be unloaded, partially loaded, or fully loaded. A trailer may be hooked to a truck to transport additional loads. The weight change may be sudden (e.g., loading 35,000 pounds in a trailer of a semi-truck) or incremental (e.g., delivering packages or collecting garbage). Furthermore, some weight changes can be not easily predictable (e.g., passengers leaving or entering a bus at the next bus stop).

Figure 1A:
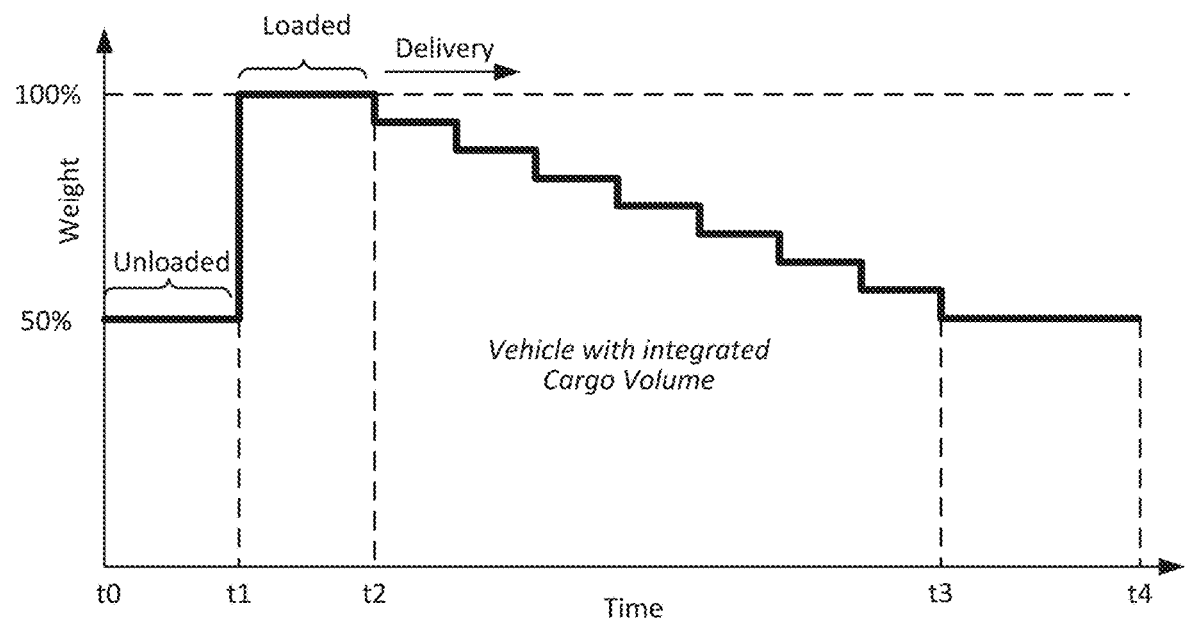
FIGS. 1A, 1B, and 1C are schematic illustrations of different vehicle weight profile examples corresponding to different operating of commercial vehicles.
Figure 1B:
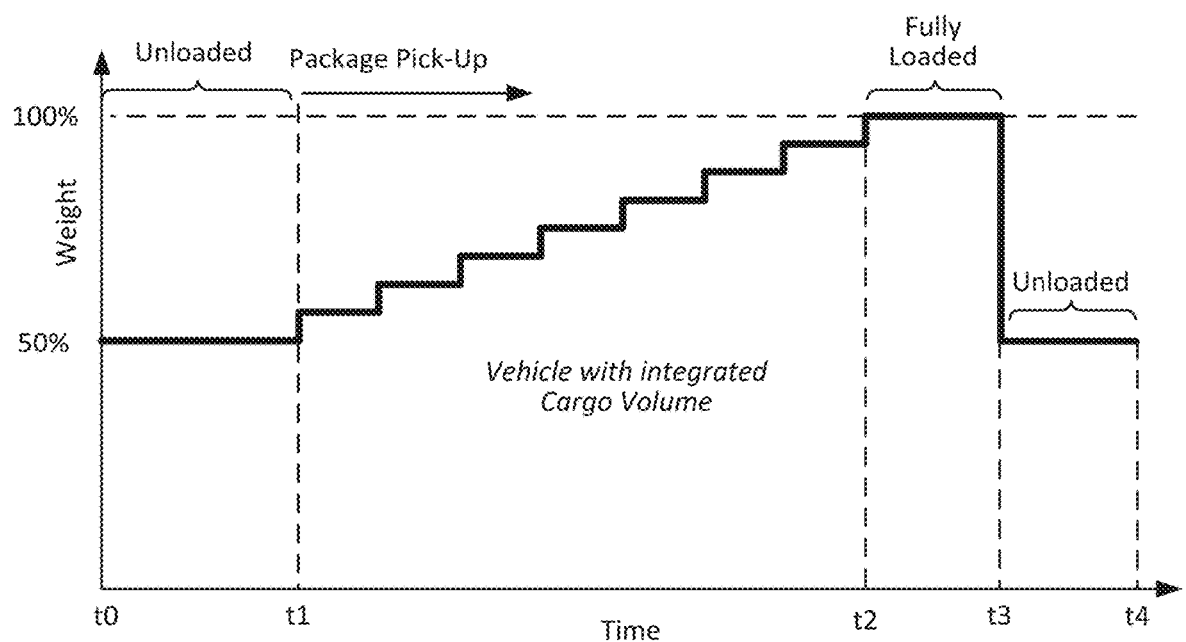

FIGS. 1A and 1B are schematic illustrations of weight profile examples of two types of commercial vehicles performing different operations. FIGS. 1A and 1B represent a vehicle with an integrated cargo volume, e.g., a delivery van, or a box truck. For example, the curb weight of a typical delivery van (e.g., Mercedes-Benz Sprinter) is about 5,000-7,000 lbs. The payload capacity is also about 5,000-7,000 lbs. In other words, the curb weight represents about 50% of the loaded weight. Referring to FIG. 1A, an unloaded vehicle is driven from t0 to t1, at which point, the vehicle is loaded. In this example, the load and the vehicle each represent about 50% of the total weight (100%). From t1 to t2, the fully-loaded vehicle is driven (e.g., to its first delivery) which continues until t3. At t3, the vehicle is completely unloaded and driven back (e.g., back to the loading location). Referring to FIG. 1B, an unloaded vehicle is driven from t0 to t1, which corresponds to the first pick-up location. Additional package pick-ups continue until t2, at which point the fully-loaded vehicle is driven (between t2 and t3) to a drop-off location. At t3, the vehicle is completely unloaded and is driven back (e.g., to a new package pickup location).

Figure 1C:
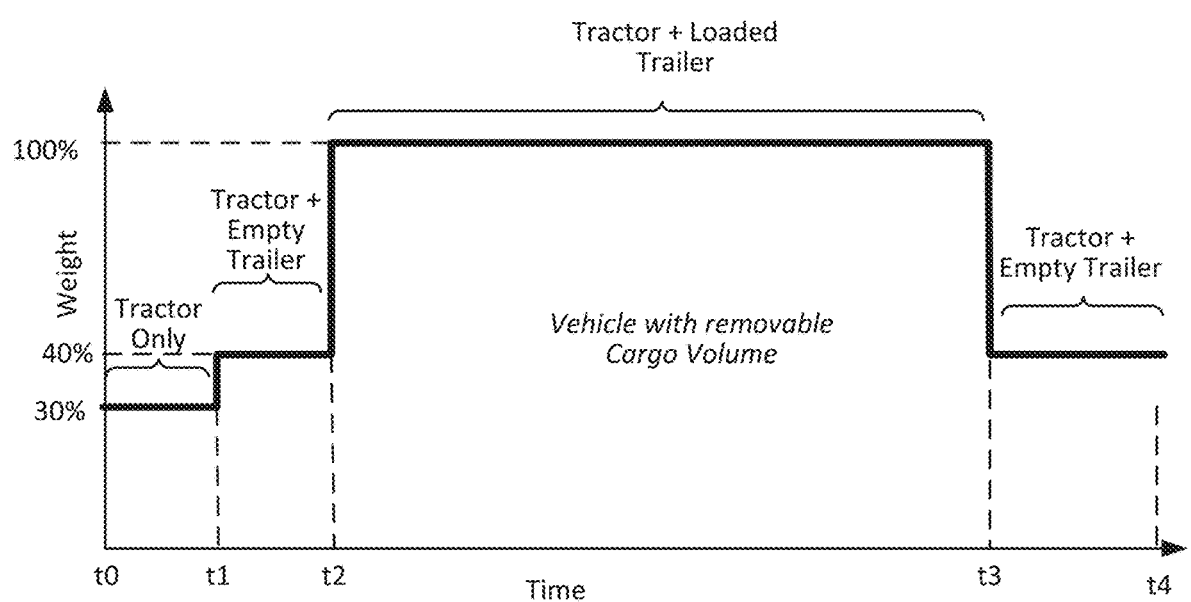

FIG. 1C represents a vehicle with a removable cargo volume, e.g., a semi-truck. For example, the curb weight of a typical semi-truck without a trailer is about 25,000 lbs. A semi-truck with an empty trailer weighs about 35,000 lbs, while a semi-truck with a fully loaded trailer can weigh as much as 80,000 lbs. In other words, the weight of a semi-truck without a trailer represents about 30% of the total loaded weight, while the weight of a semi-truck with an empty trailer represents about 40% of the total loaded weight. Referring to FIG. 1B, a semi-truck without a trailer is driven from t0 to t1, at which point, an empty trailer is hooked up to the truck. From t1 to t2, the semi-truck with the empty trailer is driven to its loading destination. From t2 to t3, the loaded semi-truck is driven to a load dropoff location, at which point the trailer is unloaded and the semi-truck with the empty trailer is driven away.

One having ordinary skill in the art would appreciate that vehicle weight has a significant impact on vehicle operation. For example, a heavier vehicle needs more power to accelerate and harder braking (and possibly a longer distance) to slow down. Additional weight and also weight distribution impacts vehicle stability. For example, a loaded semi-truck tends to have a much higher center of gravity than the unloaded one. This impact can be further applied by road conditions (e.g., grade, traction) and other factors.

At the same time, different vehicle systems (e.g., braking, power management, suspension) are tuned for specific weight targets in conventional commercial vehicles. In other words, the same setup is used regardless of the current vehicle weight, e.g., for fully loaded vehicles and also for unloaded vehicles. The responsibility for weight variations falls on drivers. Specifically, a driver has to be aware of the current vehicle weight (e.g., at least intuitively) and adjust the drivers' control input to accommodate for the vehicle dynamics caused by different weights. Fully relying on the driver to compensate for vehicle weight variations puts a lot of stress on the driver and requires a large amount of skill. As a result, commercial vehicles require special operating licenses, especially large vehicles such as semi-trucks.

Described herein are methods and systems for in situ estimating the weight of commercial vehicles and using these weight estimates for various controls, e.g., adjusting vehicle systems, providing inputs, and the like. For example, the weight can be estimated automatically by the vehicle and during normal vehicle operation. The vehicle does not need to travel to special locations (e.g., truck weight scales) or use any specific external devices. The weight estimate is performed by the vehicle systems, in particular by a weight estimator that receives various inputs from other vehicle systems.

Weight Estimator Examples

Figure 2A:
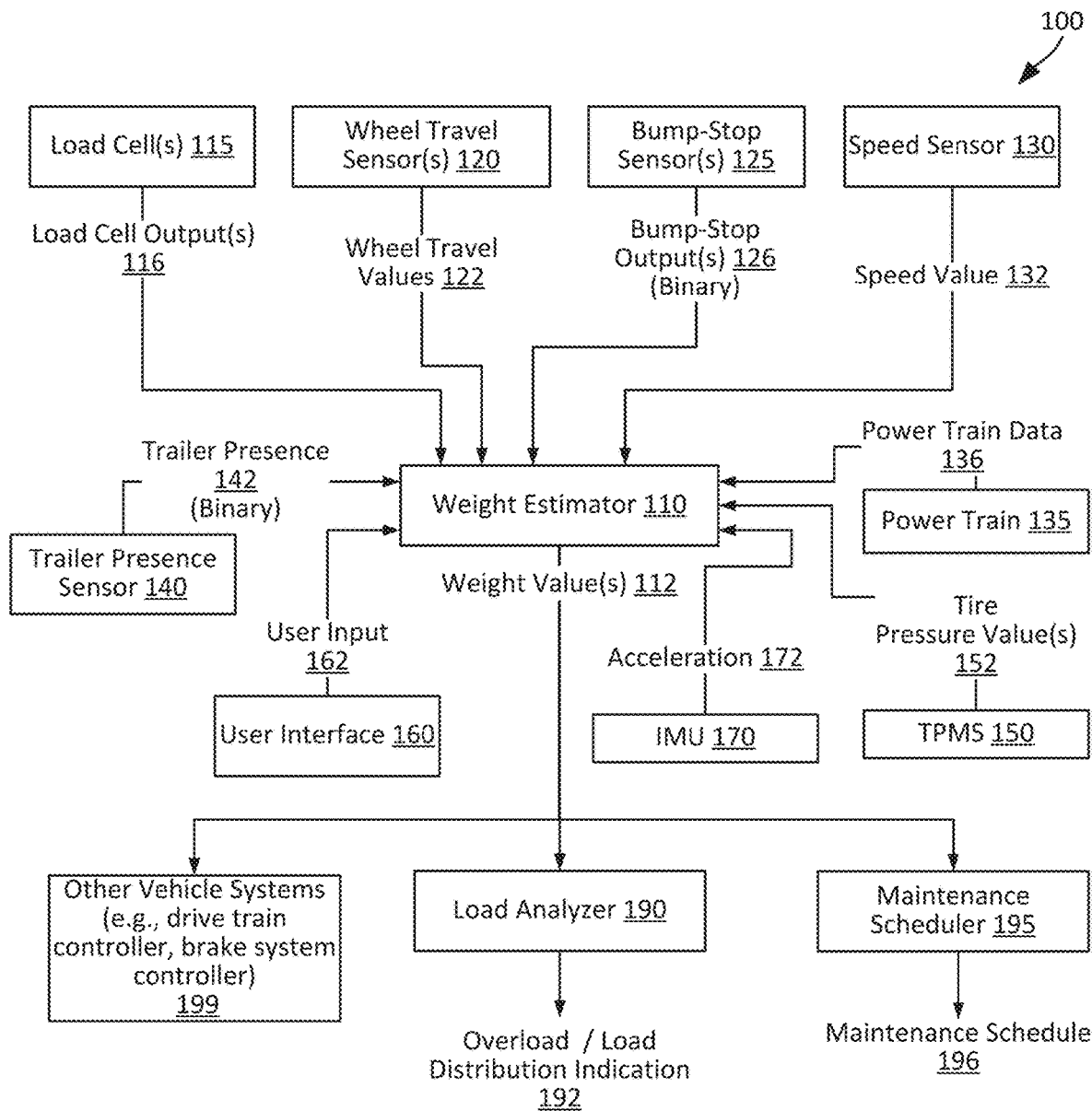
FIG. 2A is a schematic illustration of a commercial vehicle, comprising a weight estimator communicatively coupled to different vehicle systems and configured to receive various types of input from these systems, in accordance with some examples.

FIG. 2A is a schematic illustration of commercial vehicle 100, comprising weight estimator 110, in accordance with some examples. Weight estimator 110 is configured to receive input from one or more vehicle systems and to estimate weight values 112 based on these inputs. In other words, the weight-estimation process is performed at the vehicle integration level using vehicle sensors and without a need for additional systems, either on the vehicle or external to the vehicle. Weight estimator 110 can be a standalone hardware component (e.g., an electronic unit/computer system) or integrated into another system of vehicle 100 (e.g., one of the vehicle control modules).

For example, weight estimator 110 is configured to receive input from one or more load cells 115 of vehicle 100. This type of weight estimator's input may be also referred to as load cell output 116. These load cells 115 are positioned, e.g., at each axle or even at each wheel of vehicle 100. It should be noted that while load cell output 116 can be used directly as an example of weight value 112, weight estimator 110 can further process load cell output 116 to increase the accuracy of accurate weight value 112 (e.g., by comparing, combining, or otherwise collectively processing with other types of inputs).

In the same or other examples, weight estimator 110 is configured to receive input from one or more wheel travel sensors 120. This type of weight estimator's input may be also referred to as wheel travel values 122. More specifically, each wheel travel sensor 120 is configured to measure the movement (deflection/distance) of the corresponding wheel relative to the vehicle body (e.g., frame). For example, the wheel travel will be less for a heavier vehicle (traveling through the same bump as a lighter vehicle) since the suspension is loaded/compressed more. This input may be coupled with the current suspension settings, e.g., to determine the weight estimate. For example, wheel travel values 122 can be combined with the vehicle's position data and the vehicle condition database (e.g., providing scores of various road conditions for various locations). In some examples, weight estimator 110 comprises various calibration data to interpret this and other types of input to determine weight values 112. In some examples, wheel travel values 122 can be analyzed together with acceleration input 172 from inertial measurement unit (IMU) 170 to determine weight values 112 (e.g., based on predetermined calibration data).

In some examples, weight estimator 110 is configured to receive input from one or more bump-stop sensors 125. This type of weight estimator's input may be also referred to as bump-stop outputs 126 and can be in a binary form (e.g., "Contact" and "No Contact"). Bump-stop sensor 125 is configured to detect when the suspension (e.g., a shock absorber) reaches its limit defined by this sensor. In some examples, this input may be combined with acceleration input 172 from IMU 170. For example, IMU 170 can measure accelerations along one or more axes, such as measuring the vertical acceleration immediately before reaching the bump-stop limit) and/or with the current suspension settings, e.g., to determine weight values 112 (e.g., based on predetermined calibration data).

In some examples, weight estimator 110 is configured to receive input from speed sensor 130. More specifically, speed sensor 130 repeatedly provides current speed value 132. Weight estimator 110 uses multiple instances of speed value 132 as well as the duration between these instances to determine vehicle acceleration. Weight estimator 110 then combines the vehicle acceleration with the vehicle power input (e.g., power train data 136 received from power train 135) to determine vehicle weight values 112 (e.g., m=F/a). In some examples, vehicle acceleration can be also analyzed together with the input from a brake system (e.g., the brake pedal position) to determine weight values (e.g., based on predetermined calibration data). In some examples, speed value 132 (that can be constant) may be analyzed together with the road grade (e.g., incline/decline) in addition to the powertrain output and/or braking data to determine vehicle weight values 112 (e.g., based on predetermined calibration data).

In some examples, weight estimator 110 is configured to receive tire pressure values 152 from tire pressure monitoring system (TPMS) 150. In general, a higher supported weight corresponds to a higher pressure. For example, weight estimator 110 may comprise lookup tables with correlations of tire pressure values and vehicle weights. In more specific examples, weight estimator 110 may also use ambient temperature as an input, as the ambient temperature also influences the tire pressure.

In some examples, weight estimator 110 is configured to receive trailer presence input 142 from trailer presence sensor 140. Trailer presence input 142 is another example of a binary input, e.g., "trailer hooked up" and "no trailer." For example, trailer presence sensor 140 may monitor trailer lights, trailer brakes, or other systems associated with the trailer. Furthermore, weight estimator 110 may receive various trailer weight values from the trailer that are obtained from various sensors on the trailer (e.g., trailer load cells, trailer wheel travel sensors, trailer bump-stop sensors, trailer TPMS, trailer IMU, and the like)

In some examples, weight estimator 110 is configured to receive user input 162 from user interface 162. For example, user interface 162 can be a touch-screen in the vehicle cabin or the driver's mobile device (e.g., a smartphone), which is communicatively coupled to weight estimator 110 (e.g., wirelessly or with wired connections). Some examples of user input 162 include, but are not limited to, externally obtained vehicle weight (e.g., presented to the driver), trailer presence, and the like.

Different types of weight values 112 are within the scope, e.g., a total vehicle weight value, a weight-per-axle value, a weight-per-wheel value, and a weight at a specific location in the vehicle (e.g., in the loading area). It should be noted that aerodynamic drag and rolling resistance can be used in addition to weight values 112 for the powertrain mapping, and extracting the load from the accelerating force that correlates to the vehicle mass.

Weight estimator 110 may transmit these weight values to other vehicle systems, such as load analyzer 190, maintenance scheduler 195, and/or other vehicle systems 199 (e.g., a drivetrain controller, a brake system controller, and/or a suspension controller, examples of which are further described below). These other systems can use weight values 112 to further improve the operation of vehicle 100, e.g., to change vehicle dynamics (acceleration and/or braking) and/or change loading configuration.

Figure 2B:
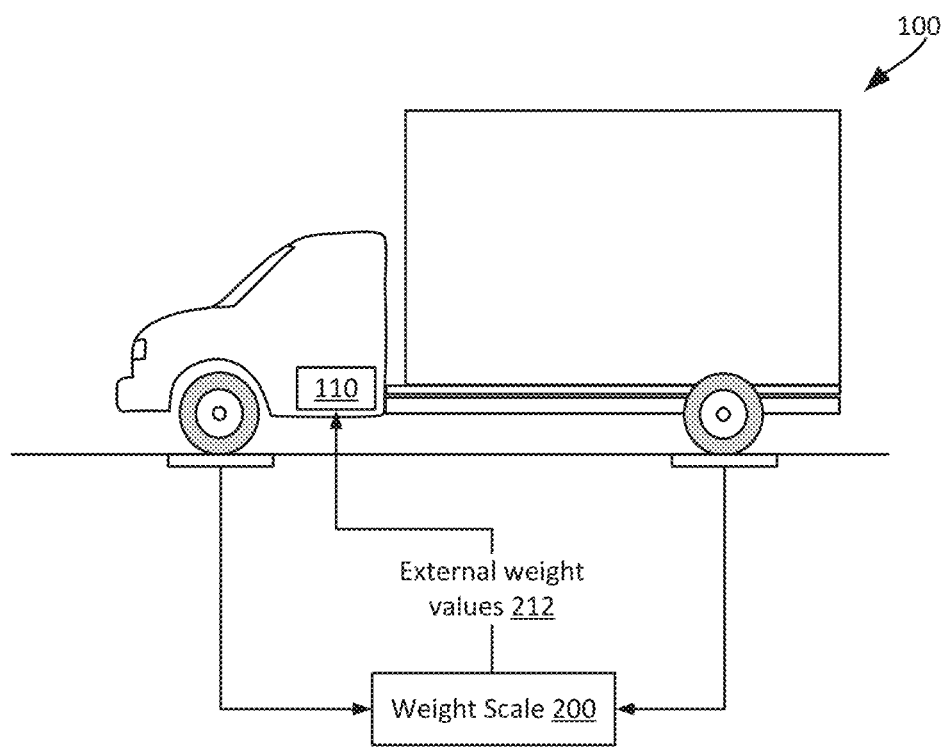
FIG. 2B is a schematic illustration of a commercial vehicle receiving an external weight estimation, in accordance with some examples.

FIG. 2B is a schematic illustration of vehicle 100 positioned on weight scale 200, which is external to vehicle 100. In some examples, weight scale 200 is configured to generate one or more external weight values 212, e.g., the total vehicle weight, the weight per axle, and/or the weight per wheel. Furthermore, weight scale 200 is configured to transmit (e.g., wirelessly, through the user input), these external weight values 212 to vehicle 100 or, more specifically, to weight estimator 110. Weight estimator 110 can use these external weight values 212 as references while analyzing internal inputs, e.g., from vehicle sensors. For example, weight estimator 110 can establish correlations between these internal inputs and external weight values 212 and later use these inputs to determine internal weight values 112. In the same or other examples, weight estimator 110 can calibrate internal weight values 112 based on external weight values 212.

Examples of Methods for Determining Weight Estimates

Figure 3:
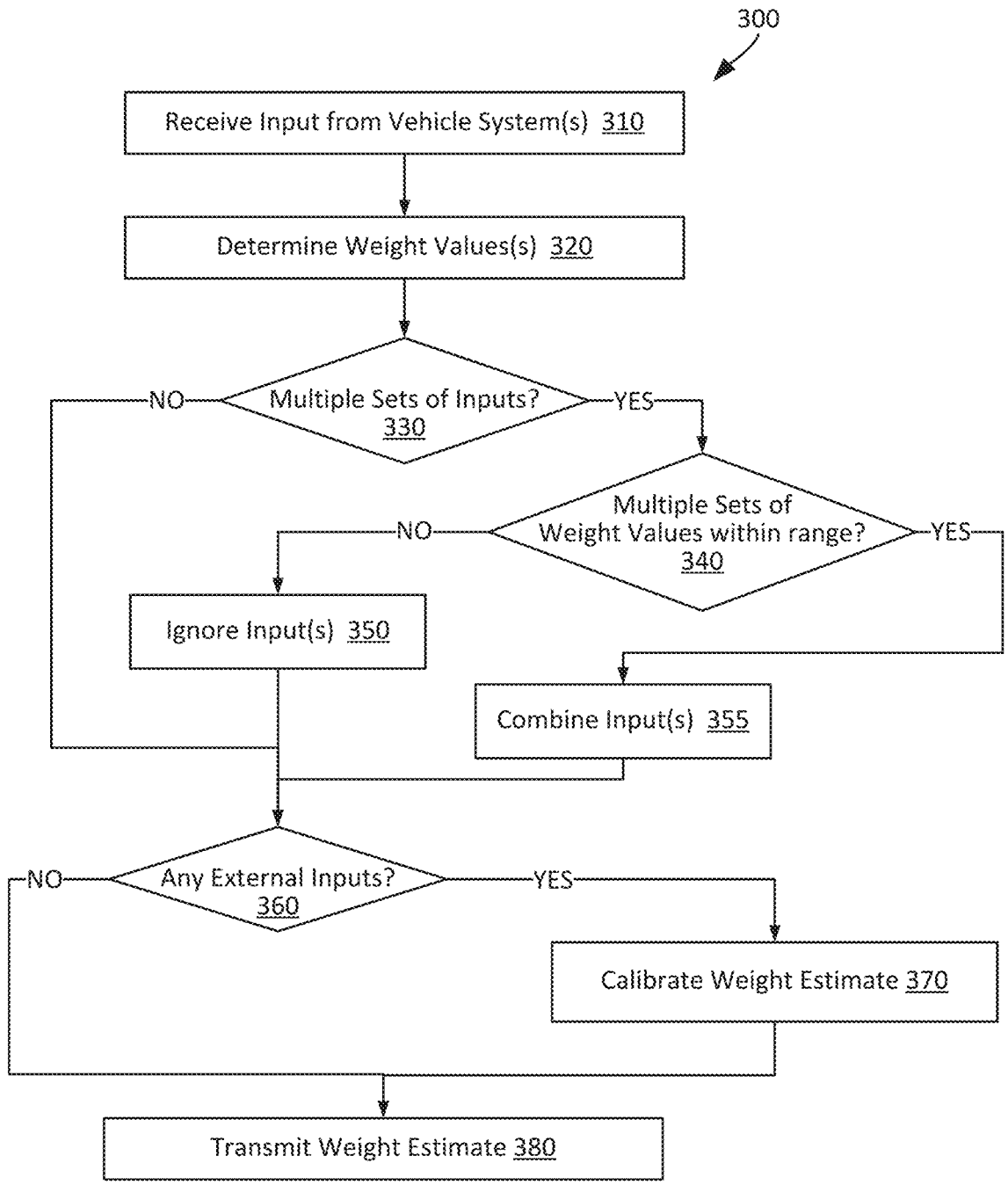
FIG. 3 is a process flowchart corresponding to a method of estimating the weight of a commercial vehicle, in accordance with some examples.

FIG. 3 is a process flowchart corresponding to method 300 for estimating the weight of commercial vehicle 100 or, more specifically, for determining one or more weight values 112 from various inputs, in accordance with some examples. The key operations of this method are performed by weight estimator 110. Some examples and functions of weight estimator 110 are described above with reference to FIGS. 2A and 2B. Additional aspects of weight estimator 110 are presented with reference to FIG. 14.

Method 300 comprises receiving (block 310), at weight estimator 110, input from one or more vehicle systems or from one or more systems outside of commercial vehicle 100. Various examples of these systems are described above with reference to FIG. 2A. These systems are communicatively coupled with weight estimator 110 using, e.g., controller area network (CAN), local interconnect network (LIN), FlexRay automotive communication bus, automotive ethernet, onboard automotive long-term evolution (LTE), wireless fidelity (Wi-Fi), and/or Bluetooth communication systems. Some examples of these inputs are shown in and discussed above with reference to FIG. 2A and include, but not limited to, load cell output 116, wheel travel input 122, vehicle speed 132, trailer presence input 142 (e.g., binary input—trailer connected vs. not connector), bump-stop reached input, tire pressure 152, and the like. These inputs are received, e.g., by weight estimator 110, which uses these inputs for determining one or more weight values 112 associated with commercial vehicle 100.

Method 300 proceeds with determining (block 320) one or more weight values 112 of vehicle 100. These weight values 112 are determined based on the received input. For example, weight estimator 110 may use various lookup tables, correlations, and other techniques (e.g., stored in the memory of weight estimator 110) to determine the weight estimate. For example, an observer (e.g., Kalman Filter or, more specifically, Unscented Kalman Filter) can be used for tracking various inputs to weight estimator 110 including vehicle states (e.g., vehicle mass, aero/rolling resistance, vehicle grade, vehicle velocity, wheel speeds, axle torque from the motor, axle load). These vehicle states correspond to various measured parameters described herein. Weight estimator 110 can be configured to correct running estimates during the vehicle operation depending on enablement criteria.

In some examples, weight values 112 comprise the total weight of vehicle 100 (e.g., suitable for controlling the overall power output), the weight per axle (e.g., to control braking bias, regenerative braking), the weight per wheel (e.g., for stability control), the weight at a specific location (e.g., to determine the load distribution on a vehicle), and/or center of mass in vehicle 100.

Method 300 proceeds with checking (decision block 330) if multiple internal inputs have been received by weight estimator 110. In some examples, multiple different inputs are used to determine one or multiple weight values 112. For example, speed values 132 may be analyzed together with power train data 136 and/or braking system inputs. In general, using multiple different inputs tends to increase the accuracy of weight values 112.

In some examples, different types of inputs are separately used to determine different sets of weight values 112. For example, wheel travel values 122 can be used to determine one set of weight values 112, and tire pressure values 152 can be used to determine another set of weight values 112. These determinations can be performed independently from each other, e.g., based on previously established correlations between these input types and vehicle weights.

These different/independent sets of weight values 112 can be then compared to determine (decision block 340) if these multiple sets of weight values 112 are within a set range. For example, the set of weight values 112 determined based on wheel travel values 122 can deviate from the set of weight values 112 determined based on tire pressure values 152. In these situations, one or more of these sets can be ignored (block 350) as less accurate. Alternatively, different sets can be combined (block 355), e.g., averaged, to determine a single set for additional use. It should be noted that the powertrain data (e.g., motoring axle torque, wheel speeds) are useful only in vehicle motion. Load cells (e.g., provided at each axle) can be used when the vehicle is stationary.

In some examples, method 300 comprises checking (decision block 360) if there are any external weight inputs. These external weight inputs can be more precise estimates of the vehicle weight than weight values 112 produced by weight estimator 110 and can be used, e.g., for the calibration of weight estimator 110. For example, vehicle 100 can be positioned on a scale, which provides external weight inputs to vehicle 100 or, more specifically, to weight estimator 110 as described above with reference to FIG. 2B. When available, the external weight inputs can be used for calibration weight estimator 110 (block 370), e.g., to modify various correlations between internal vehicle inputs and weight values 112, determined based on these inputs. For example, these correlations are updated internally by weight estimator 110 and stored in the memory of weight estimator 110. In some examples, these correlation updates (self-learning) of weight estimator 110 can be performed continuously, e.g., by correlating axle load cells to axle weights.

Figure 4:
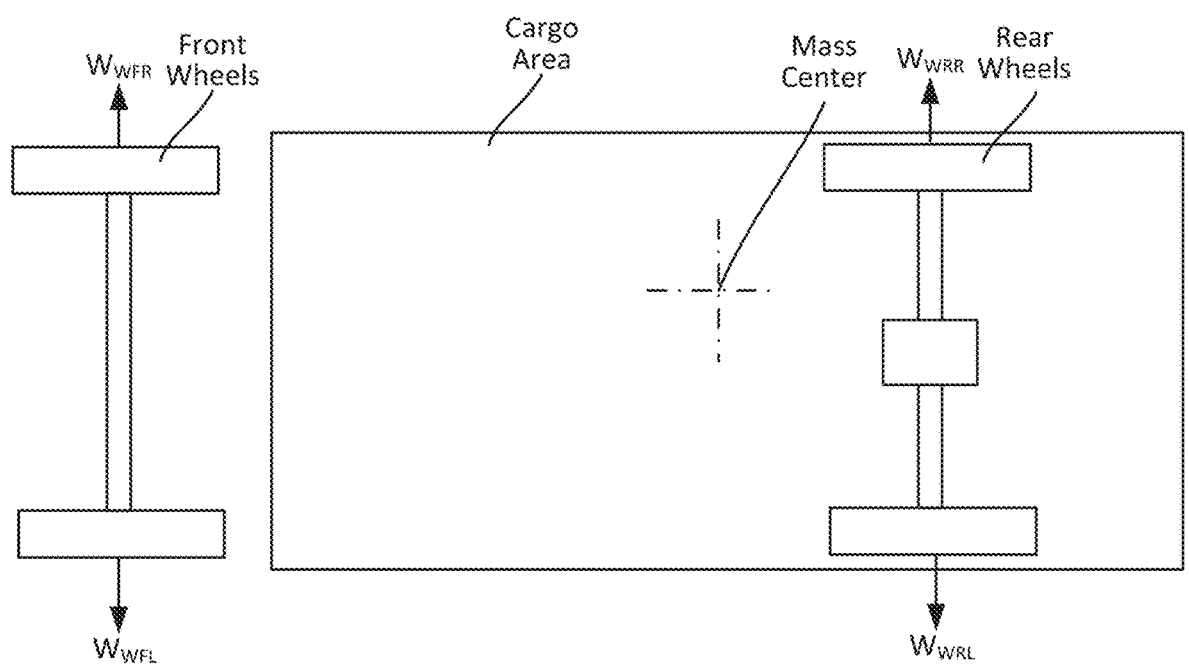
FIG. 4 is a schematic illustration of using multiple weight values to determine the vehicle weight distribution/weight center, in accordance with some examples.

Method 300 proceeds with transmitting (block 380) weight values 112 to one or more vehicle systems, such as load analyzer 190 and/or maintenance scheduler 195. For example, load analyzed 190 can use weight values 112 to determine the distribution of the load on the vehicle (e.g., finding the mass center as schematically shown in FIG. 4). This information can be used, e.g., to change this distribution. This information can be used by loading personnel to change the load distribution. In some examples, load analyzed 190 can issue an overload alert.

In some examples, weight values 112 are used by maintenance scheduler 195 together with other inputs (e.g., distance driver, fuel consumed) to determine maintenance schedule 196. Specifically, operating vehicle 100 with a higher load causes more wear on various systems, such as the vehicle's powertrain and brakes. Maintenance scheduler 195 can use a combination of the vehicle weight and distance traveled to identify what vehicle components need to be maintained and at what time. For example, the vehicle weight profile can be integrated over the distance traveled by vehicle 100 to determine the next maintenance point. In some examples, other inputs are used by maintenance scheduler 195, such as acceleration input 172 from IMU 170. For example, when vehicle 100 is operated in areas with heavy traffic (e.g., with frequent acceleration and braking), the wear on various vehicle systems can increase, in particular when vehicle 100 carries a heavy load.

Drive Train Controller Examples

Figure 5A:
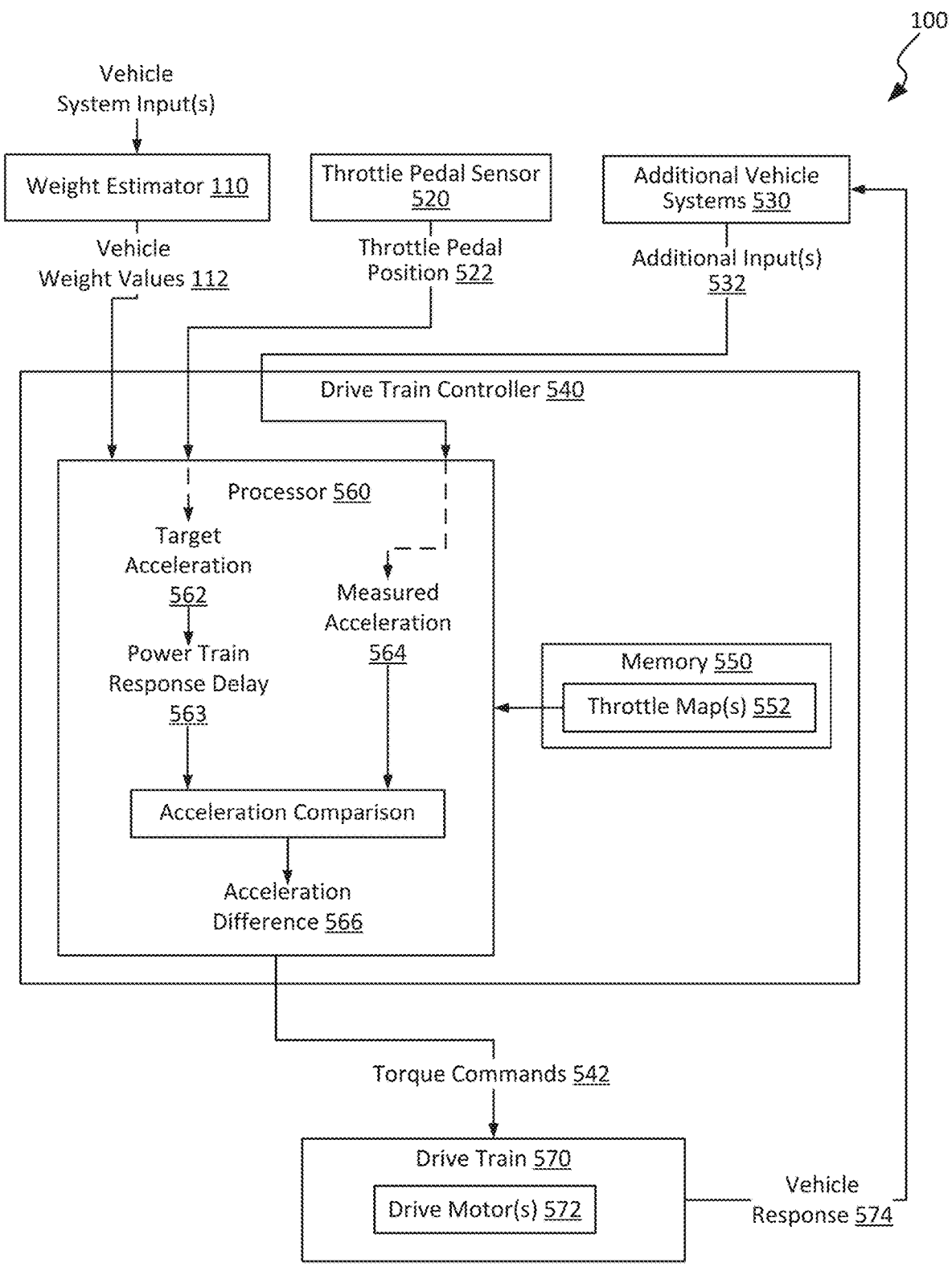
FIG. 5A is a block diagram of vehicle systems comprising a drive train controller configured to receive vehicle weight values and to generate torque commands, in accordance with some examples.

FIG. 5A is a block diagram of vehicle 100 comprising drive train controller 540 configured to receive vehicle weight values 112 and to generate torque commands 542, in accordance with some examples. Vehicle 100 also comprises weight estimator 110, throttle pedal sensor 520, additional vehicle systems 530, and drive train 570, each communicatively coupled to drive train controller 540. For example, a CAN bus or other vehicle communication systems can be used for this communicative coupling. Each one of these components will now be described in more detail. Weight estimator 110 is configured to provide vehicle weight values 112 to drive train controller 540. In some examples, weight values 112 are automatically determined using weight estimator 110 from various inputs provided by vehicle systems as described above with reference to FIGS. 2A, 2B, 3, and 4. In some examples, weight estimator 110 is integrated into drive train controller 540, which can be an electronic control unit (ECU) responsible for the operation of drive train 570.

Throttle pedal sensor 520, which may be also referred to as an accelerator pedal position sensor, is mechanically coupled to a throttle (accelerator) pedal and configured to measure the position of this pedal. The output of throttle pedal sensor 520 is throttle pedal position 522 representing how far the pedal is pressed by the driver. For example, throttle pedal position 522 of 0% may represent the pedal not being pressed (e.g., in a free-standing position), while 100% may represent a fully pressed position. In conventional vehicles, throttle pedal position 522 directly corresponds to torque command 542. For example, the 0% value of throttle pedal position 522 corresponds to the 0% value of torque command 542 (e.g., idle), while 100% value of throttle pedal position 522 corresponds to the 100% value of torque command 542 (e.g., maximum torque/acceleration).

Additional vehicle systems 530 may include a speedometer, global positioning system (GPS), rain sensor, humidity sensor, temperature monitor, and the like. For example, the speedometer may provide vehicle speed to drive train controller 540. As further described below, the vehicle speed is used as additional input (besides throttle pedal position 522 and vehicle weight values 112) to determine torque command 542. In some examples, a GPS or a vehicle tilt sensor is used to determine the current road grade. The road grade can be combined with throttle pedal position 522 and vehicle weight values 112 to determine torque command 542. For example, when vehicle 100 is traveling uphill, torque command 542 may request a higher power output from drive train 570 than when vehicle 100 is traveling on a flat (horizontal) road (even for the same throttle pedal position 522). Inversely, when vehicle 100 is traveling downhill, torque command 542 may request a lower power output from drive train 570 than when vehicle 100 is traveling on a flat (horizontal) road (for the same throttle pedal position 522). In some examples, rain sensors, humidity sensors, and/or temperature monitors may be used to determine road conditions, e.g., if the road is wet or icy.

Referring to FIG. 5A, drive train controller 540 comprises memory 550 and processor 560. Memory 550 stores one or more throttle maps 552, various examples of which are described below with reference to FIGS. 6A and 6B. Throttle maps 552 are used by processor 560 to determine torque commands 542 based on vehicle weight values 112 and throttle pedal position 522 (and potentially additional inputs 532). Torque commands 542 are transmitted to drive train 570 and are used by drive train 570 to operate each drive motor 572. In some examples, other operating instructions are stored in memory 550. Additional features of memory 550 and processor 560 are described below with reference to FIG. 14.

Figure 6A:
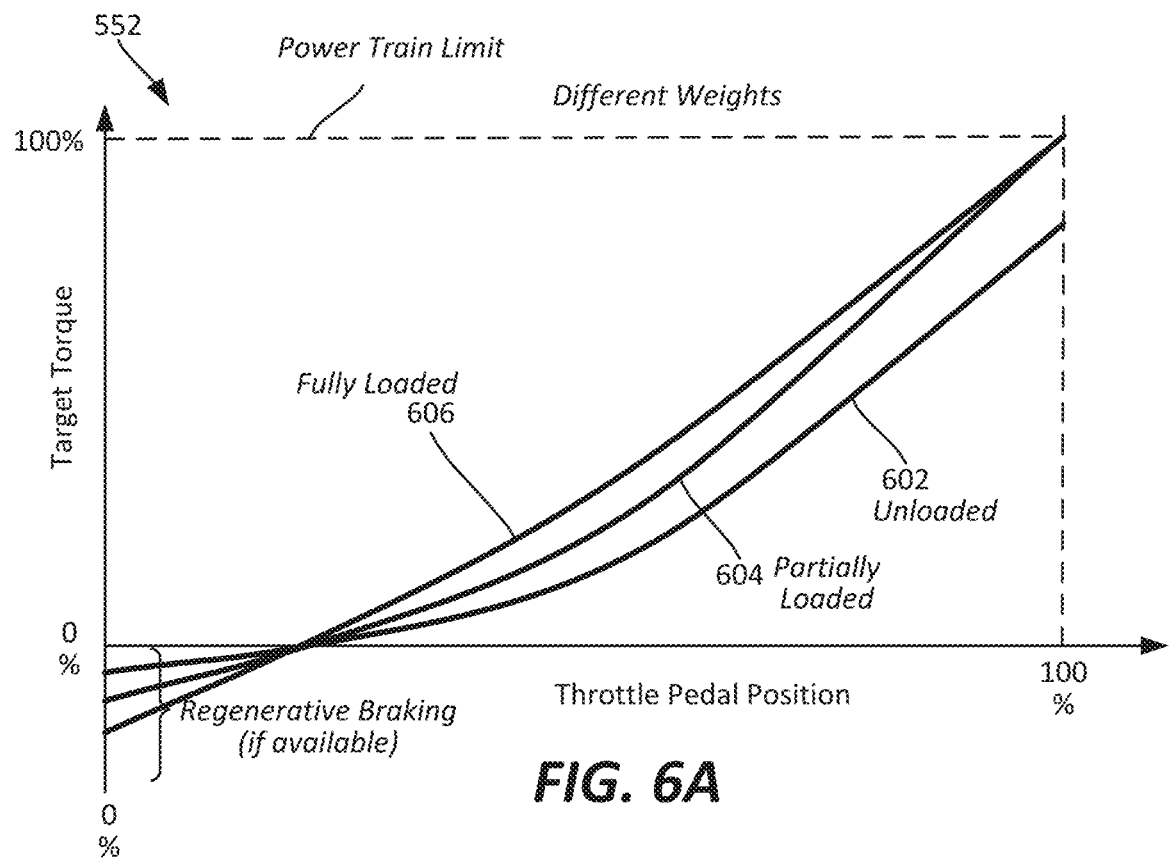
FIGS. 6A and 6B are examples of different throttle maps used for different vehicle weights and different vehicle speeds.
Figure 6B:
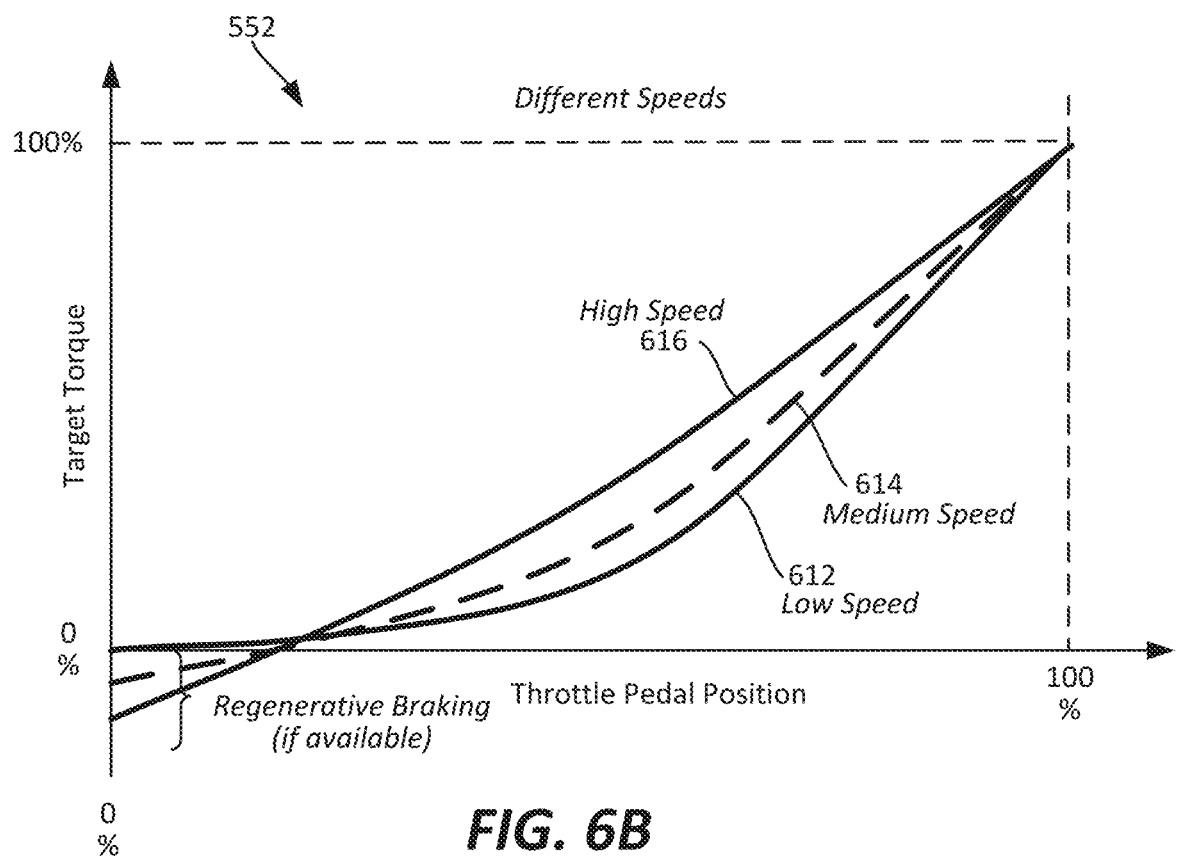

In some examples, processor 560 is configured to determine target acceleration 562 of vehicle 100 from throttle pedal position 522. Two examples of the relationship between target acceleration 562 and throttle pedal position 522 are shown in FIGS. 6A and 6B and described below. Furthermore, processor 560 is configured to determine measured acceleration 564, e.g., from the vehicle speed (received from speed sensor 130) or, more specifically, from vehicle speed changes or directly from IMU 170. Processor 560 is configured to compare target acceleration 562 with measured acceleration 564 to determine acceleration difference 566 and to determine torque commands 542 at least in part based on acceleration difference 566. This provides an additional control loop to accommodate for any factors impacting the drive train response. These factors may not have been directly accounted for by drive train controller 540. For example, when measured acceleration 564 is less than target acceleration 562, torque commands 542 are updated with higher torque requirements. On the other hand, when measured acceleration 564 is less than target acceleration 562, torque commands 542 are updated with reduced torque requirements.

Figure 5B:
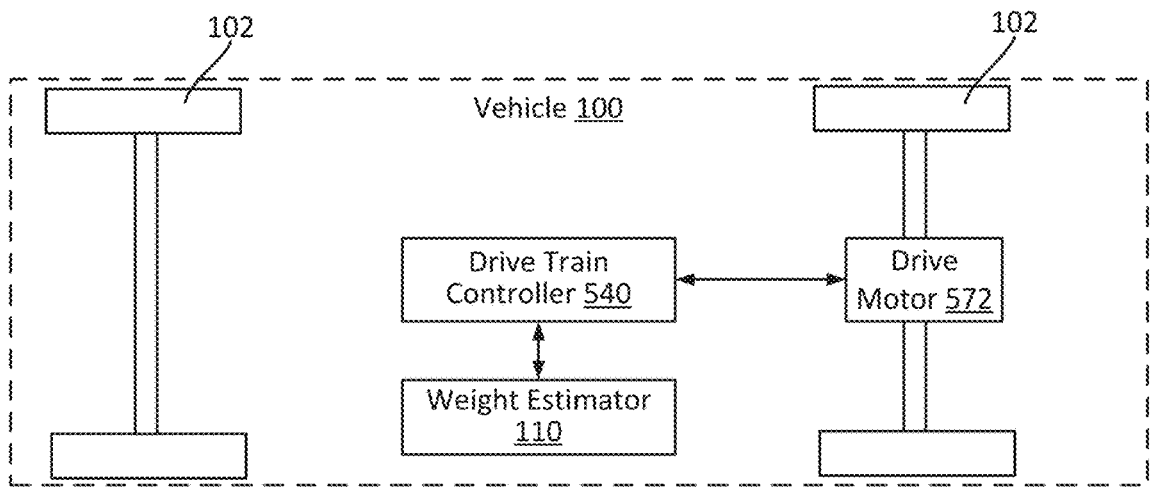
FIGS. 5B-5D are schematic illustrations of different drive train configurations in a vehicle.
Figure 5C:
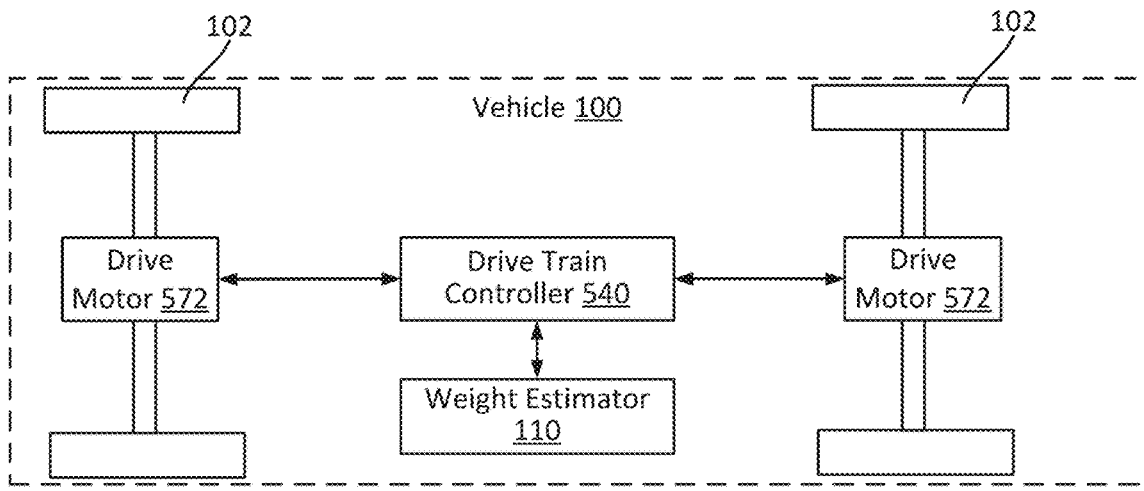
Figure 5D:
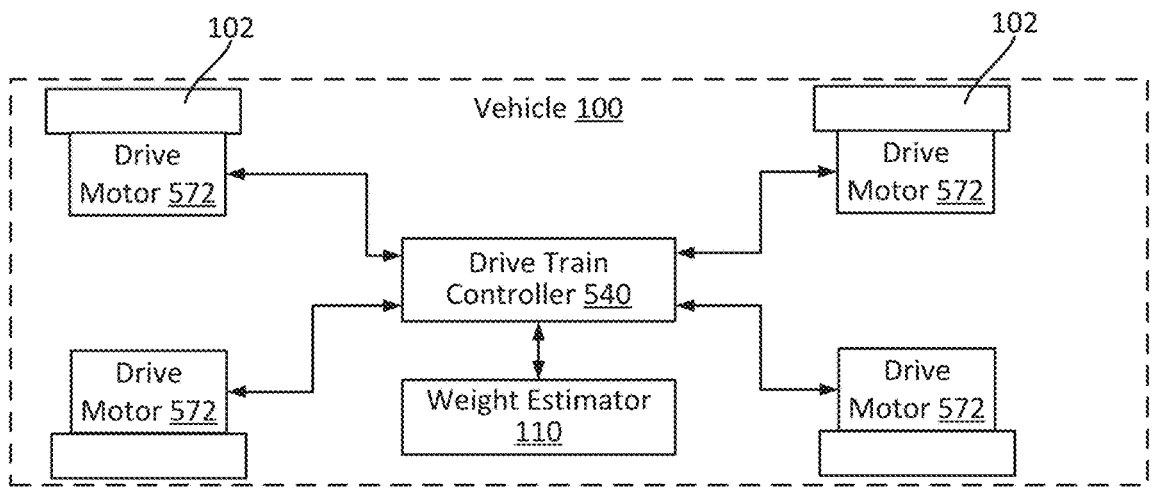

FIGS. 5B, 5C, and 5D are schematic illustrations of different drive train configurations. Depending on the drive train configurations and the type of vehicle weight values 112 different types of vehicle acceleration control are within the scope. FIG. 5B illustrates an example with one drive motor 572 positioned at the vehicle's rear axle. In this configuration, one torque command may be provided from drive train controller 540 to this one drive motor 572. FIG. 5C illustrates an example with two drive motors 572, one positioned at the vehicle's rear axle and one positioned at the vehicle's front axle. In this configuration, two separate torque commands may be provided from drive train controller 540, e.g., one torque command for each drive motor 572. These torque commands may be different from each other and, in some examples, may depend on the vehicle weight distribution, e.g., a portion of the total vehicle weight supported by the front axle vs. a portion of the total vehicle weight supported by the rear axle. These weight portions provide additional granularity in the overall vehicle dynamic control. For example, these weight portions determine, at least in part, the traction of the wheels on each axle with the road. FIG. 5D illustrates an example with drive motor 572 positioned at each wheel. In this configuration, one torque command may be provided from drive train controller 540 to each drive motor 572, e.g., based on the portion of the total vehicle weight supported by this wheel. In some examples, individual wheel speeds can be used to refine these multiple torque commands to minimize wheel sleep.

FIGS. 6A and 6B illustrate different examples of throttle maps 552. Specifically, FIG. 6A illustrates throttle map 602 for an unloaded vehicle, throttle map 604 for a half-loaded vehicle, and throttle map 606 for a fully-loaded vehicle. One having ordinary skill in the art would appreciate that a heavier vehicle needs more torque to achieve the same acceleration. As such, for most positions of the throttle pedal, fully-loaded throttle map 606 has the highest position, while unloaded-vehicle throttle map 602 has the lowest position. At the 100% throttle pedal position (i.e., with the throttle pedal being fully pressed/against the limiter), the target torque may be at the limit (set by the vehicle's drive train). As such, fully-loaded throttle map 606 and half-loaded throttle map 604 converge. However, fully-loaded throttle map 606 may reach the maximum target torque much earlier (e.g., well before the 100% throttle pedal position). At the same time, the maximum target torque may not be needed for an unloaded vehicle, and the unloaded-vehicle throttle map 602 never reaches a 100% target torque level.

FIG. 6B illustrates three throttle maps 552 for different vehicle speeds, e.g., throttle map 612 represents a low speed, throttle map 614 represents a medium speed, and throttle map 616 represents a high speed. For example, when the vehicle is traveling at high speeds, a higher torque response is needed to change the acceleration of the vehicle by the same amount (e.g., due to much higher resistance from air and road). Another factor that may be accounted for in throttle maps 552 (not shown in FIGS. 5A and 5B) is the road grade estimate.

It should be noted that throttle map 552 of different types (e.g., weight-based maps in FIG. 6A, speed-based maps in FIG. 6B, grade-based maps, road-condition maps, and the like) may be used together. In some examples, different types of maps have different coefficients assigned, indicating the relative importance of each map to the resulting target torque.

Examples of Methods of Controlling Vehicle Acceleration

Figure 7:
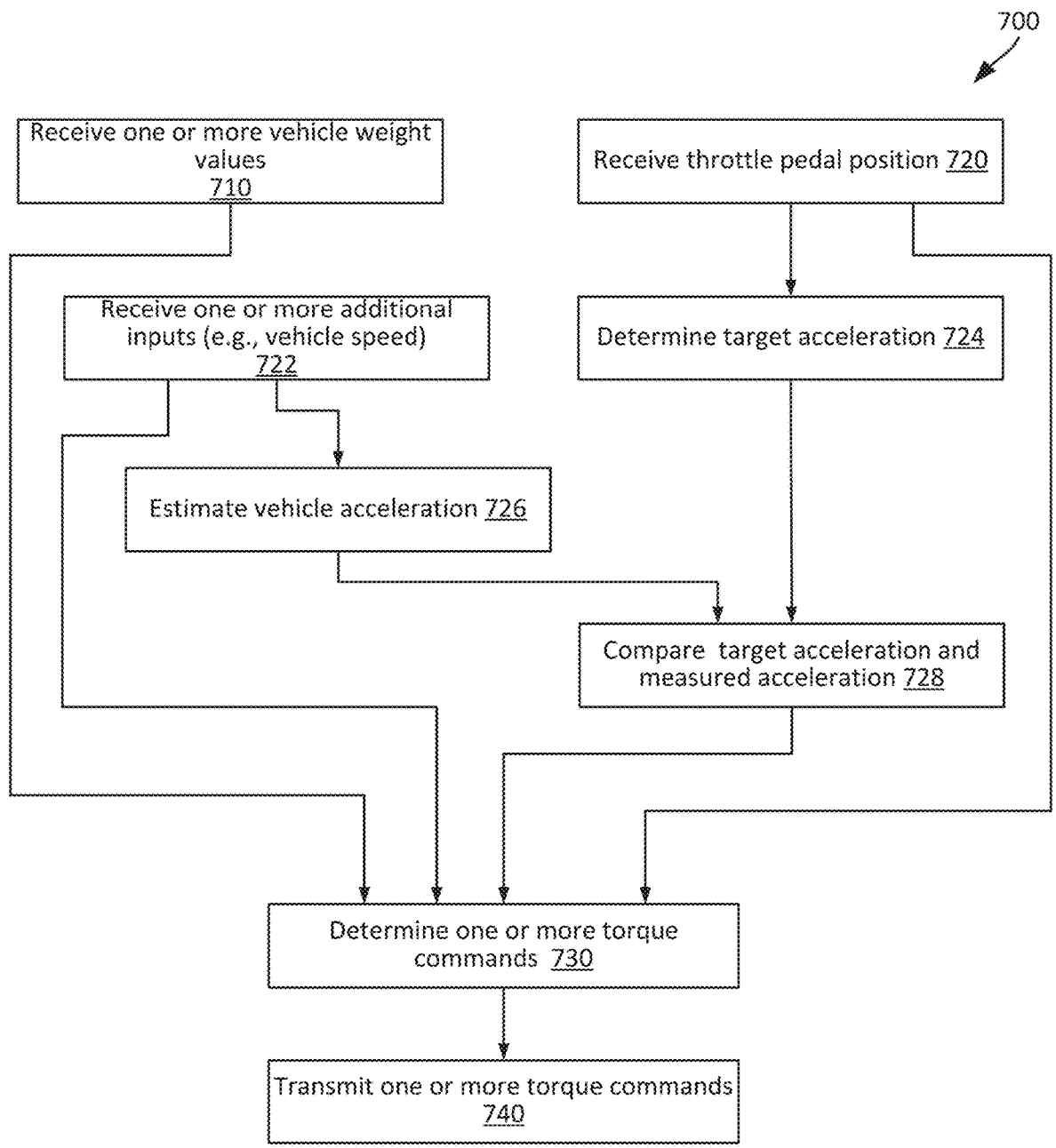
FIG. 7 is a process flowchart corresponding to a method of controlling a vehicle drive train, in accordance with some examples.

FIG. 7 is a process flowchart corresponding to method 700 of controlling the acceleration of vehicle 100, in accordance with some examples. Various examples of vehicle 100 are described above. In general, vehicle 100 comprises drive train controller 540 and drive train 570 described above with reference to FIG. 5A.

Method 700 comprises receiving (block 710) one or more vehicle weight values 112 at drive train controller 540. For example, vehicle weight values 112 are received from weight estimator 110, e.g., automatically determining vehicle weight values 112 from various inputs provided by vehicle systems such as load cells, wheel travel sensors, bump-stop sensors, tire pressure management system, trailer hookup, and the like, e.g., as described above with reference to FIGS. 2A, 2B, 4, and 4. Vehicle weight values 112 may include various types of weight values, e.g., a total vehicle weight, weight at each axle, and/or weight at each wheel. These types of values depend on the configuration and capabilities of weight estimator 110.

Method 700 comprises receiving (block 720) throttle pedal position 522 at drive train controller 540. For example, throttle pedal position 522 is received from throttle pedal sensor 520, either directly or through other vehicle systems. Throttle pedal position 522 is received continuously as throttle pedal position 522 tends to change during the vehicle operation. Vehicle weight values 112 may be received as a one-time input (e.g., after loading/unloading vehicle 100) or repeatedly (e.g., for multi-stop delivery vehicles). Vehicle weight values 112 and throttle pedal position 522 are received at drive train controller 540 independently from each other. Both inputs are needed for method 700 to proceed.

In some examples, method 700 also comprises receiving (block 722) one or more additional inputs 532 at drive train controller 540. For example, one or more additional inputs 532 are selected from the group consisting of vehicle speed, acceleration, road grade, wheel-road traction, and vehicle dynamic selection. Some examples of these additional inputs 532 are described above with reference to FIG. 2A. The one or more torque commands 542 are further determined based on one or more additional inputs 532.

Method 700 comprises determining (block 730) one or more torque commands 542 based on one or more vehicle weight values 112 and throttle pedal position 522. Torque commands 542 are determined at drive train controller 540 and using throttle map 552. Various examples of throttle map 552 are described above with reference to FIGS. 6A and 6B. In some examples, when torque command 542 corresponds to the maximum output of drive train 570, method 700 also involves sending an update to driver's user interface (e.g., to alert the driver that the maximum output is reached for the current conditions, including the current throttle pedal position).

In some examples, multiple torque commands 542 are determined (e.g., one for each motor). For example, FIG. 5C illustrates two drive motors 572, one on each axle, that may receive individual torque commands 542. Multiple torque commands 542 can be generated to optimize the energy consumption given the relative efficiency maps of the power path on each axle. In some examples, the regenerative portion of throttle map 552 may be biased toward the front axle to avoid rear bias and vehicle destabilization. FIG. 5D illustrates each wheel having a dedicated motor, which can be used to achieve a desired yaw rate (e.g., based on the steering wheel input/position) to create torque vectoring through differences among multiple torque commands 542.

Method 700 comprises transmitting (block 740) one or more torque commands 542 from drive train controller 540 to drive train 570. Drive train 570 uses torque commands 542 to operate one or more drive motors 572. In some examples, the number of torque commands 542 corresponds to the number of drive motors 572. For example, each drive motor 572 has a separate individually-determined torque command 542.

In some examples, method 700 further comprises determining (block 724) target acceleration 562 based on throttle pedal position 522, which can be referred to as the "throttle pedal feel" and can be controlled using various additional maps in drive train controller 540. In some examples, method 700 also comprises estimating (block 726) vehicle acceleration (e.g., measured acceleration 564) based on various sensor inputs (e.g., IMU 170). In some examples, the operation accounts for the current road grade. Method 700 proceeds with comparing (block 728) target acceleration 564 with measured vehicle acceleration 566 to determine an acceleration difference 566. In these examples, torque commands 542 are further determined based on acceleration difference 566 or, more generally, vehicle response 574 to torque commands 542. Furthermore, in some examples, target acceleration 562 is offset by power train response delay 563 when compared with measured acceleration 564.

Brake System Controller Examples

Figure 8A:
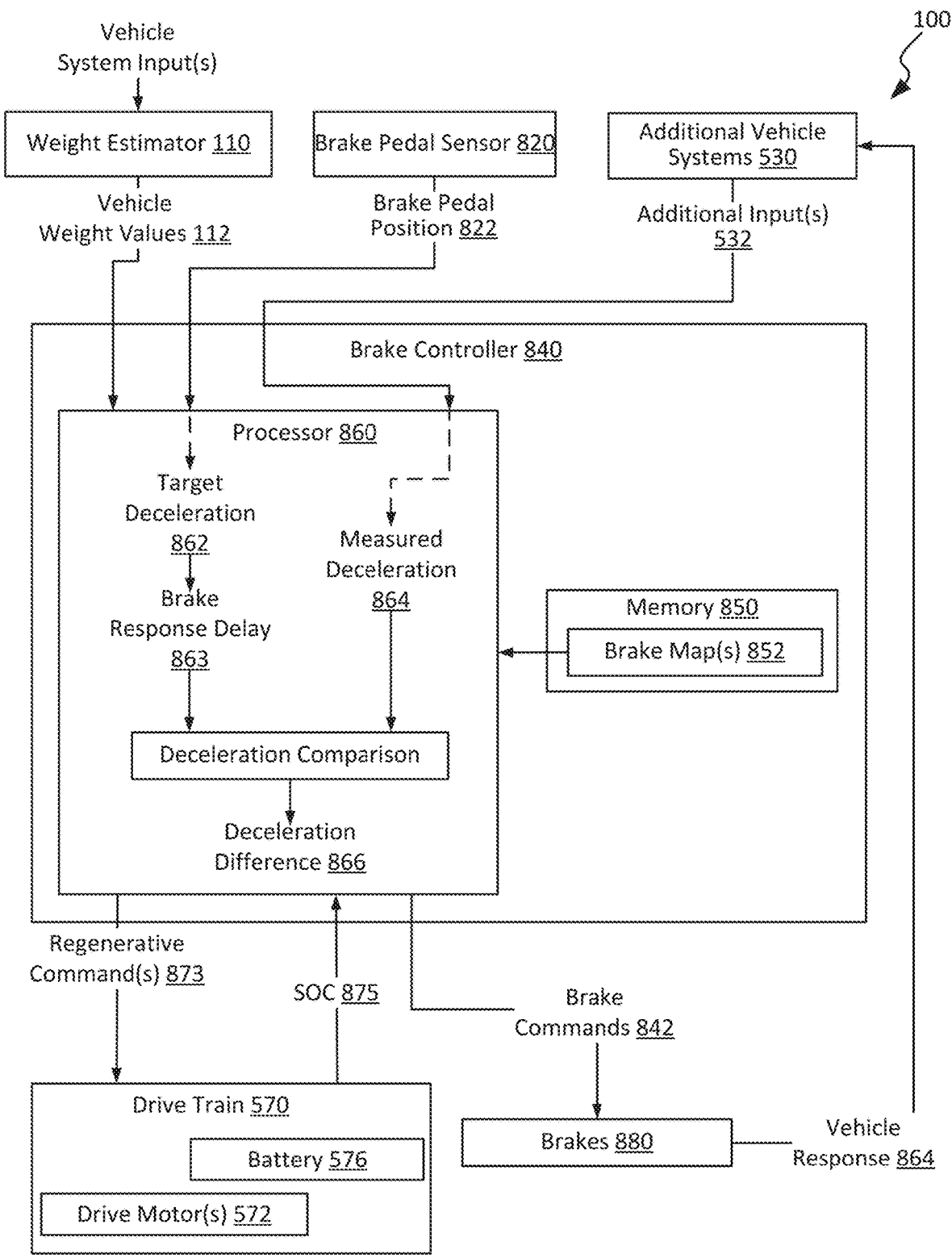
FIG. 8A is a block diagram of vehicle systems comprising a brake system controller configured to receive vehicle weight values and to generate brake commands, in accordance with some examples.

FIG. 8A is a block diagram of various systems in vehicle 100 comprising brake system controller 840 configured to receive vehicle weight values 112 and to generate brake commands 842, in accordance with some examples. Vehicle 100 also comprises weight estimator 110, brake pedal sensor 820, additional vehicle systems 530, drive train 570, and brakes 880. At least, weight estimator 110, brake pedal sensor 820, additional vehicle systems 530, and drive train 570 are each communicatively coupled to drive train controller 540. For example, a CAN bus or other vehicle communication systems can be used for this communicative coupling. Each one of these components will now be described in more detail.

Weight estimator 110 is configured to provide vehicle weight values 112 to brake controller 840. In some examples, weight values 112 are automatically determined using weight estimator 110 from various inputs provided by vehicle systems. For example, weight estimator 110 may receive input from load cells. In the same or other examples, weight estimator 110 determines weight values 112 from wheel travel values (e.g., obtained from wheel travel sensors), bump-stop outputs (e.g., obtained from bump-stop sensors), tire pressure values (e.g., obtained from a tire pressure management system), a trailer presence indicator, and the like. As noted above, vehicle weight values 112 may include various types of weight values, e.g., a total vehicle weight, weight at each axle, and/or weight at each wheel. These types of values depend on the configuration and capabilities of weight estimator 110. Various examples of determining weight values 112 are described above with reference to FIGS. 2A-2B, 3, and 4.

Brake pedal sensor 820 is mechanically coupled to a brake pedal and configured to measure the position of this pedal. The output of brake pedal sensor 820 is brake pedal position 822 representing how far the pedal is pressed by the driver. For example, brake pedal position 822 of 0% may represent the pedal not being pressed (e.g., in a free-standing position), while 100% may represent a fully pressed position (e.g., against the limited). In conventional vehicles, brake pedal position 822 directly corresponds to brake command 842, subject to stability system corrections (e.g., anti-lock braking). For example, the 0% value of brake pedal position 822 corresponds to the 0% value of brake command 842 (e.g., no braking), while the 100% value of brake pedal position 822 corresponds to the 100% value of brake command 842 (e.g., full braking). The transition between these endpoints (no braking to full braking) can be substantially linear. At least, in conventional vehicle systems, brake command 842 does not account for specific vehicle characteristics (such as weight, speeds, and the like).

Additional vehicle systems 530 may include a speedometer, global positioning system (GPS), rain sensor, humidity sensor, temperature monitor, anti-lock braking (ABS), and the like. For example, the speedometer may provide vehicle speed to brake controller 840. As further described below, the vehicle speed is used as additional input 532 (besides brake pedal position 822 and vehicle weight values 112) to determine brake command 842. In some examples, a GPS or a vehicle tilt sensor is used to determine the current road grade. The road grade can be combined with brake pedal position 822 and vehicle weight values 112 to determine brake command 842. For example, when vehicle 100 is traveling uphill, brake command 842 may request a lower pressure to be applied on the brake cylinders than when vehicle 100 is traveling on the flat (horizontal) road in response to the same brake pedal position 822. Inversely, when vehicle 100 is traveling downhill, brake command 842 may request a higher pressure to be applied to the brake cylinders than when vehicle 100 is traveling on the flat (horizontal) road, again for the same brake pedal position 822. In some examples, rain sensors, humidity sensors, and/or temperature monitors may be used to determine road conditions, e.g., if the road is wet or icy. For example, a steering angle determines the driver's intended yaw rate. A combination of the steering angle and vehicle weight values 112 can be used by the vehicle's stability system with setting different settings (e.g., gains) for stability controls under different weights Referring to FIG. 8A, brake controller 840 comprises memory 850 and processor 860. Memory 850 stores one or more brake maps 852 various examples of which are described below with reference to FIGS. 9A and 9B. Brake maps 852 are used by processor 860 to determine brake commands 842 based on vehicle weight values 112 and brake pedal position 822. Brake commands 842 are transmitted to brakes 880 and are used by brakes 880 to create different braking levels (e.g., apply different pressures on the brake cylinders at each wheel). In some examples, processor 860 also creates different energy regenerative commands 873, which are sent to drive train 570 and used by drive train 570 to operate each drive motor 572 in a regenerative mode. Regenerative commands 873 can depend on vehicle weight values 112. For example, regenerative command 873 can be selected to produce 0.2-0.3 G deceleration when vehicle 100 is unloaded and to produce up to 0.5 G deceleration when vehicle 100 is loaded. In some examples, these regenerative commands 873 may depend on the state of charge (SOC) 875 of battery 576. For example, when battery 576 is fully charged, regenerative commands 873 may be reduced (e.g., to the operating level of various power-consuming devices such as heater and air conditioner) or suspended completely. In some examples, other operating instructions are stored in memory 850. Additional features of memory 850 and processor 860 are described below with reference to FIG. 14.

Figure 9A:
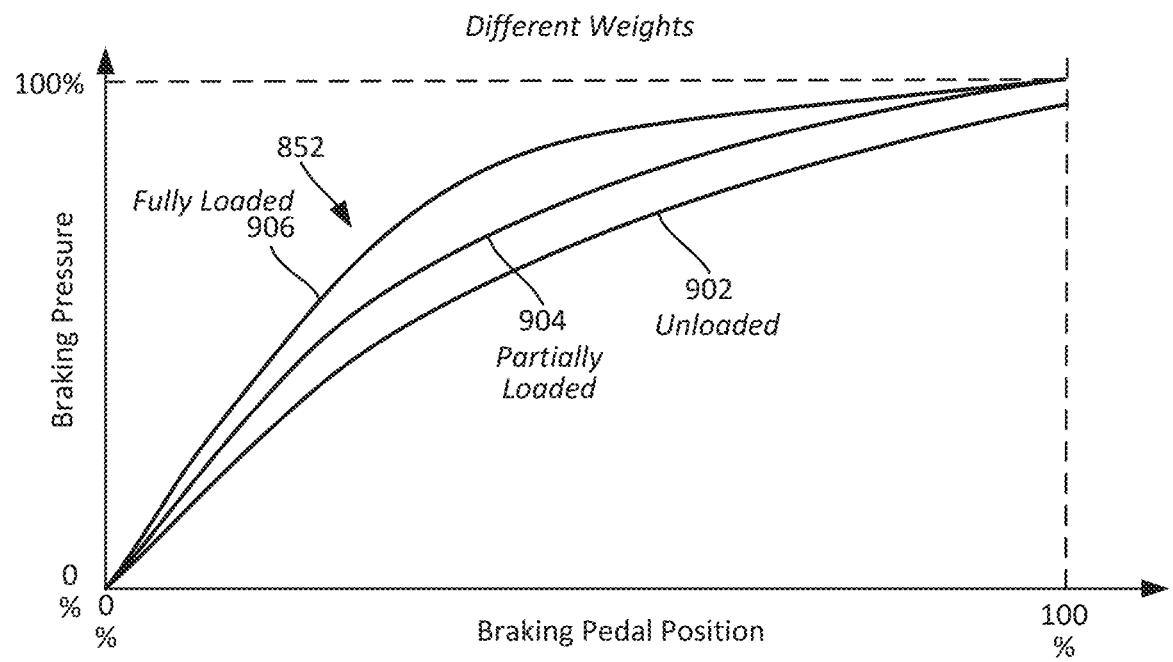
FIGS. 9A and 9B are examples of different brake maps.
Figure 9B:
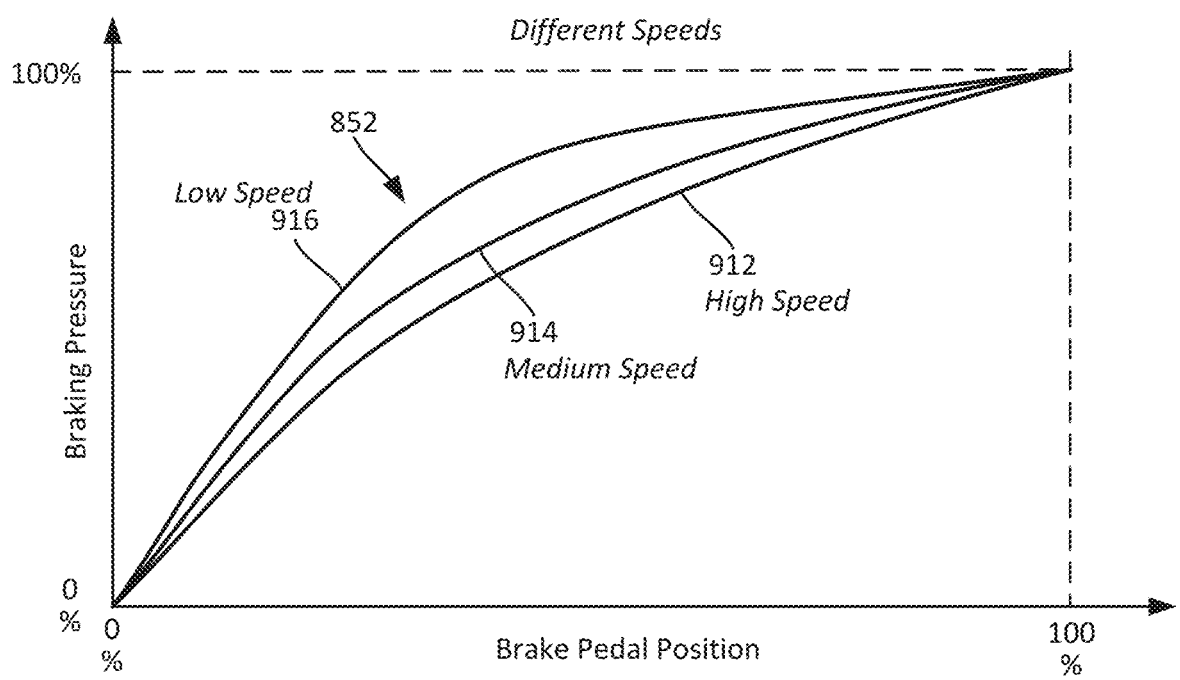

In some examples, processor 860 is configured to determine target deceleration 862 of vehicle 100 from brake pedal position 822 in addition to vehicle weight values 112. Two examples of the relationship between target deceleration 862 and brake pedal position 822 are shown in FIGS. 9A and 9B and described below. Furthermore, processor 860 is configured to determine measured deceleration 864, e.g., from the vehicle speed or, more specifically, from vehicle speed changes. Processor 860 is configured to compare target deceleration 862 with measured deceleration 864 to determine deceleration difference 866 and to determine brake commands 842 at least in part based on deceleration difference 866. This provides an additional control loop to accommodate for any factors impacting the brake response, such as brake response delay 863. These factors may not have been directly accounted for by brake controller 840. For example, when measured deceleration 864 is less than target deceleration 862, brake commands 842 are updated with higher braking requirements. On the other hand, when measured deceleration 864 is less than target deceleration 862, brake commands 842 are updated with reduced braking requirements.

Figure 8B:
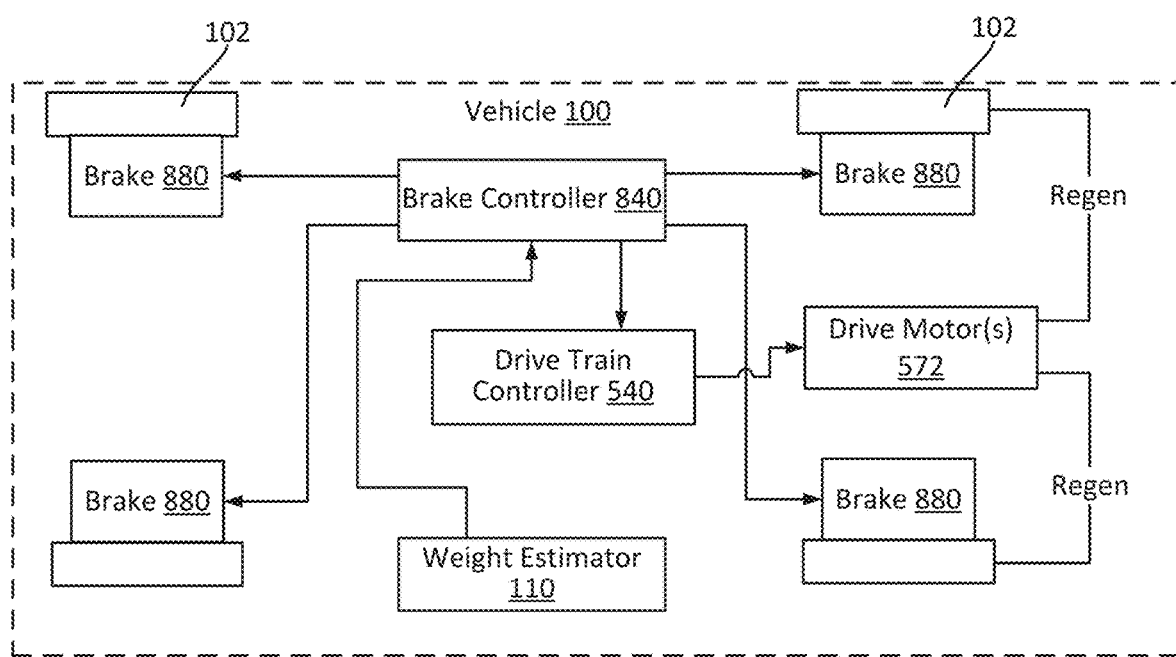
FIG. 8B is a schematic illustration of a vehicle showing interactions between the brake system controller and each brake.

FIG. 8B is a schematic illustration of one example of the braking system, in which each wheel 102 has a separate/individual brake 880. In this configuration, multiple different brake commands 842 may be provided from brake controller 840, e.g., one torque command for wheel 102. These brake commands may be different from each other and, in some examples, may depend on the vehicle weight distribution, e.g., a portion of the total vehicle weight supported by the front axle vs. a portion of the total vehicle weight supported by the rear axle, vehicle cornering characteristics, road grades, and the like. These additional factors (besides brake pedal position 822) provide additional granularity in the overall vehicle dynamic control. It should be noted that, in some examples, additional braking can be provided by drive motors 572 through regenerative braking. In these examples, brake controller 840 can provide corresponding commands to driver train controller 540, e.g., as schematically shown in FIG. 8B.

FIGS. 9A and 9B illustrate different examples of brake maps 852. Specifically, FIG. 9A illustrates brake map 902 for an unloaded vehicle, brake map 904 for a half-loaded vehicle, and brake map 906 for a fully-loaded vehicle. One having ordinary skill in the art would appreciate that a heavier vehicle needs more braking power to achieve the same deceleration. As such, for most positions of the brake pedal, fully-loaded brake map 906 has the highest position, while unloaded-vehicle brake map 902 has the lowest position. At the 100% brake pedal position (i.e., with the brake pedal being fully pressed/against the limiter), the target braking power may be at the limit (set by the vehicle's braking system). As such, fully-loaded brake map 906 and half-loaded brake map 904 converge. At the same time, the maximum braking power may not be needed for an unloaded vehicle, and the unloaded-vehicle brake map 902 never reaches 100% braking level. It should be noted that at the 0% brake pedal position (i.e., with the brake pedal is not pressed) so braking may be achieved by regenerative braking, which is separate from the braking pressure associated with mechanical brakes.

FIG. 9B illustrates brake maps 852 for different vehicle speeds, e.g., brake map 912 represents a high speed, brake map 914 represents a medium speed, and brake map 916 represents a low speed. For example, when vehicle 100 is traveling at high speeds, a lower braking response may be needed, e.g., for safety reasons. Specifically, a lower torque response corresponds to smaller vehicle deceleration ensuring the vehicle's stability on the road. As such, high-speed brake map 912 has the lowest position. Inversely, when the vehicle is traveling at low speeds, a higher braking response may be needed, e.g., to ensure the faster deceleration of the vehicle. Safety concerns are a lot less at low speeds. As such, low-speed brake map 916 has the highest position.

It should be noted that brake map 852 of different types (e.g., weight-based maps in FIG. 9A, speed-based maps in FIG. 9B, grade-based maps, road-condition maps, and the like) can be used together. In some examples, different types of maps have different coefficients assigned, indicating the relative importance of each map to the resulting braking response.

Examples of Methods of Controlling Vehicle Deceleration

Figure 10:
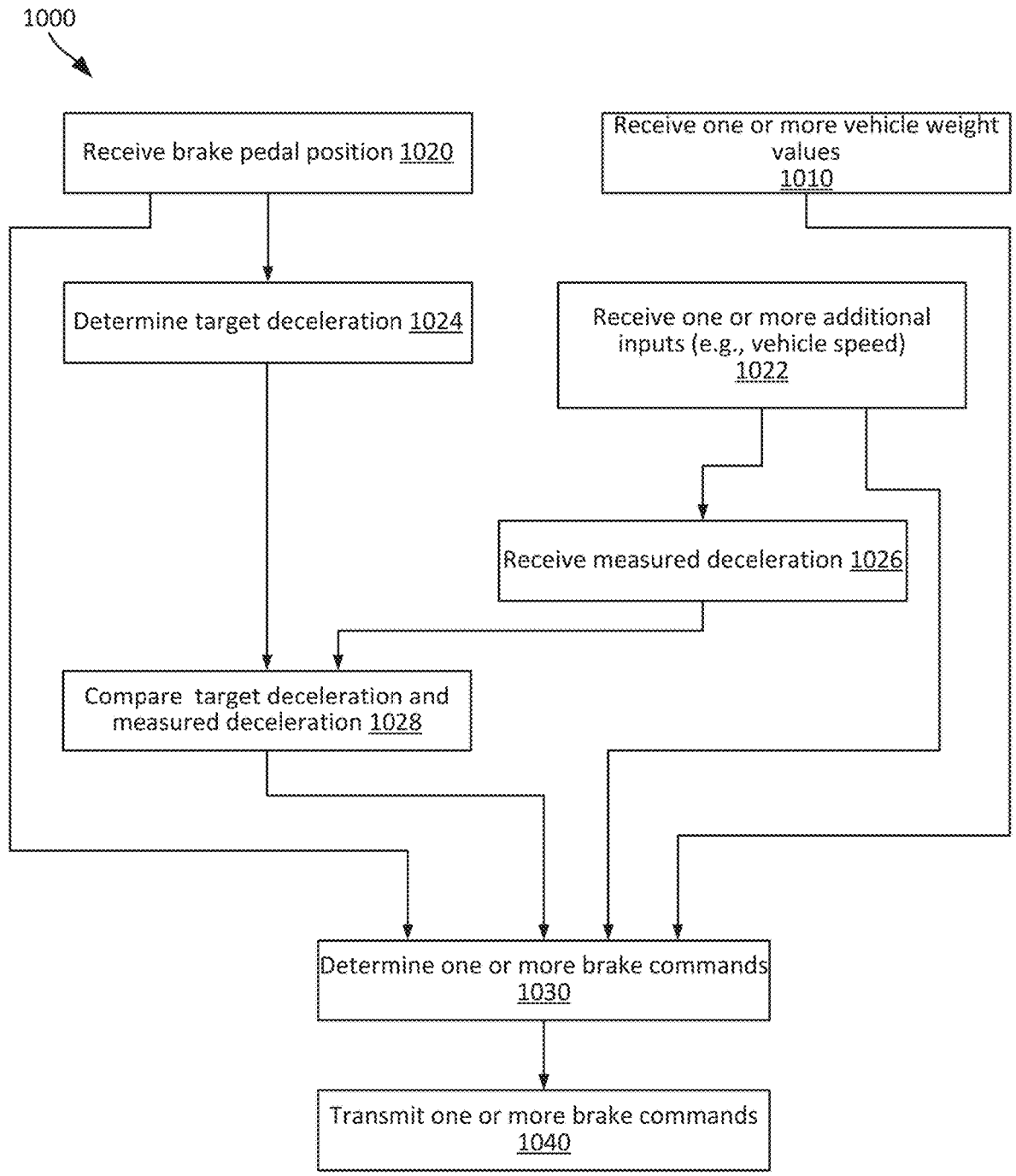
FIG. 10 is a process flowchart corresponding to a method of controlling a vehicle brake system, in accordance with some examples.

FIG. 10 is a process flowchart corresponding to method 1000 of controlling the deceleration of vehicle 100, in accordance with some examples. Various examples of vehicle 100 are described above. In general, vehicle 100 comprises brake controller 840 and brakes 880.

Method 1000 comprises receiving (block 1010) one or more vehicle weight values 112 at drive train controller 540. For example, vehicle weight values 112 are received from weight estimator 110, e.g., automatically determining vehicle weight values 112 from various inputs provided by vehicle systems such as load cells, wheel travel sensors, bump-stop sensors, tire pressure management system, trailer hookup, and the like. Vehicle weight values 112 may include various types of weight values, e.g., a total vehicle weight, weight at each axle, and/or weight at each wheel. These types of values depend on the configuration and capabilities of weight estimator 110.

Method 1000 comprises receiving (block 1020) brake pedal position 822 at brake controller 840. For example, brake pedal position 822 is received from brake pedal sensor 820, either directly or through other vehicle systems. Brake pedal position 822 is received continuously as brake pedal position 822 tends to change during the vehicle operation. Vehicle weight values 112 may be received as a one-time input (e.g., after loading/unloading vehicle 100) or repeatedly (e.g., for multi-stop delivery vehicles). Vehicle weight values 112 and brake pedal position 822 are received at brake controller 840 independently from each other. Both inputs are needed for method 1000 to proceed.

In some examples, method 1000 also comprises receiving (block 1022) one or more additional inputs 532 at brake controller 840. For example, one or more additional inputs 532 are selected from the group consisting of vehicle speed, road grade, and wheel-road traction, vehicle dynamic selection. The one or more brake commands 842 are further determined based on one or more additional inputs 532.

Method 1000 comprises determining (block 1030) one or more brake commands 842 based on one or more vehicle weight values 112 and brake pedal position 822. Brake commands 842 are determined at brake controller 840 and using brake map 852. Various examples of brake map 852 are described above with reference to FIGS. 6A and 6B.

Method 1000 comprises transmitting (block 1040) one or more brake commands 842 from brake controller 840 to brakes 880 (e.g., to an actuator connected to the brake master cylinder). In some examples, the number of brake commands 842 corresponds to the number of brakes 880. For example, each brake 880 has a separate individually-determined brake command 842.

In some examples, method 1000 further comprises determining (block 1024) target deceleration 862 based on brake pedal position 822, receiving (block 1026) measured deceleration 864, and comparing (block 1028) target deceleration 864 with measured vehicle deceleration 866 to determine deceleration difference 866. In these examples, brake commands 842 are further determined based on deceleration difference 866.

Suspension Controller Examples

Figure 11A:
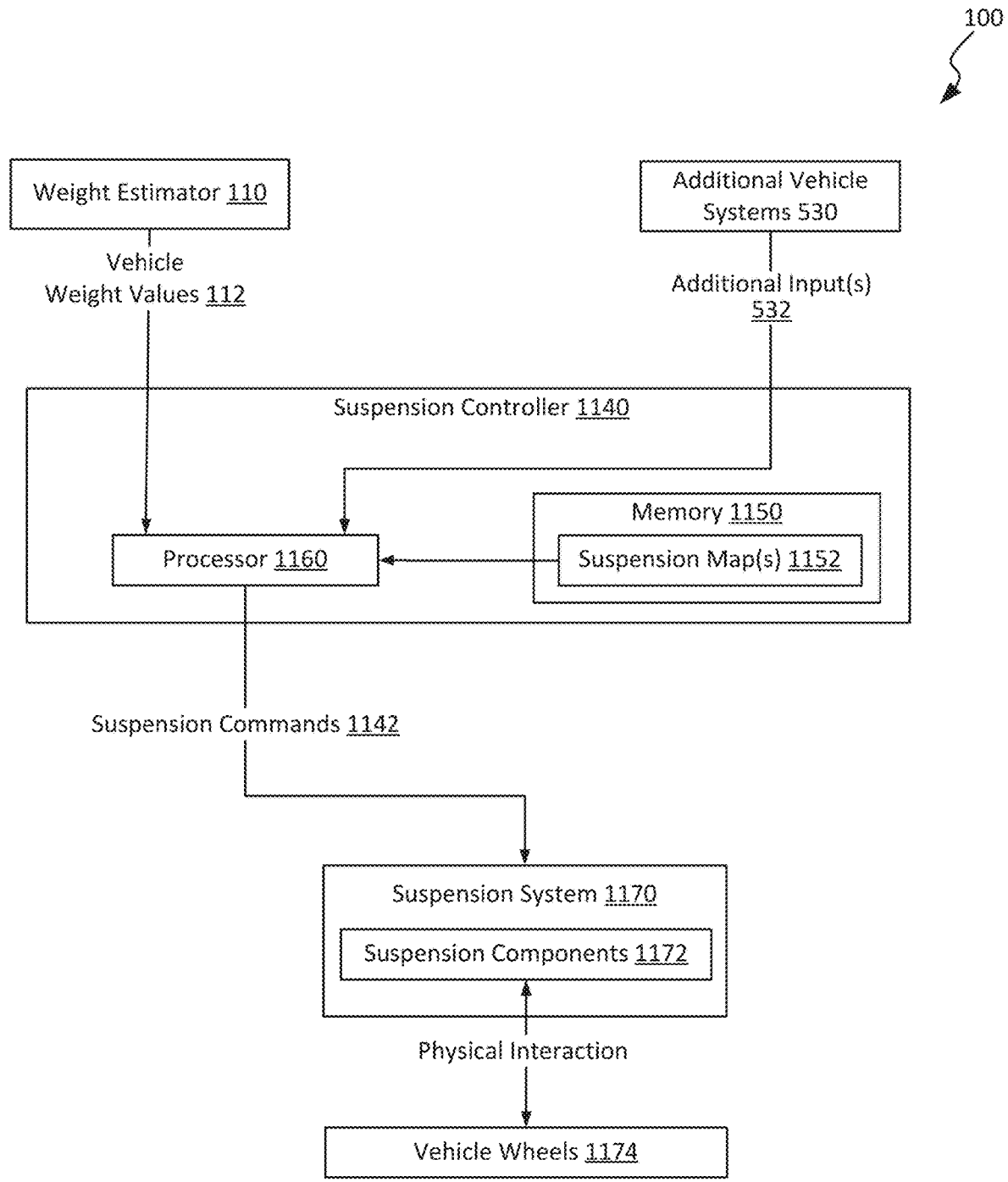
FIG. 11A is a block diagram of vehicle systems comprising a suspension controller configured to receive vehicle weight values and to generate suspension commands, in accordance with some examples.

FIG. 11A is a block diagram of vehicle 100 comprising suspension controller 1140 configured to receive vehicle weight values 112 and to generate suspension commands 1142, in accordance with some examples. Vehicle 100 also comprises weight estimator 110, additional vehicle systems 530, and suspension system 1170, each communicatively coupled to suspension controller 1140. For example, a CAN bus or other vehicle communication systems can be used for this communicative coupling. Each one of these components will now be described in more detail.

Weight estimator 110 is configured to provide vehicle weight values 112 to suspension controller 1140. In some examples, weight values 112 are automatically determined using weight estimator 110 from various inputs provided by vehicle systems. For example, weight estimator 110 may receive input from load cells. In the same or other examples, weight estimator 110 determines weight values 112 from wheel travel values (e.g., obtained from wheel travel sensors), bump-stop outputs (e.g., obtained from bump-stop sensors), tire pressure values (e.g., obtained from a tire pressure management system), a trailer presence indicator, and the like. As noted above, vehicle weight values 112 may include various types of weight values, e.g., a total vehicle weight, weight at each axle, and/or weight at each wheel. These types of values depend on the configuration and capabilities of weight estimator 110. Various examples of determining weight values 112 are described above with reference to FIGS. 2A, 2B, 3, and 4.

Additional vehicle systems 530 may include a speedometer, global positioning system (GPS), rain sensor, humidity sensor, temperature monitor, and the like. For example, the speedometer may provide the vehicle speed to suspension controller 1140. As further described below, the vehicle speed is used as additional input 532 (beside vehicle weight values 112) to determine suspension command 1142. In some examples, a GPS or a vehicle tilt sensor is used to determine the current road grade. The road grade can be combined with vehicle weight values 112 to determine suspension command 1142. In some examples, rain sensors, humidity sensors, and/or temperature monitors may be used to determine road conditions, e.g., if the road is wet or icy.

Referring to FIG. 11A, suspension controller 1140 comprises memory 1150 and processor 160. Memory 1150 stores one or more suspension maps 1152 various examples of which are described below with reference to FIG. 12. Suspension maps 1152 are used by processor 1160 to determine suspension commands 1142 based vehicle weight values 112 and any additional inputs 532, when these additional inputs are available. Some examples of suspension commands 1142 include suspension firmness (damping) and suspension travel. In some examples, multiple suspension commands 1142 are generated, e.g., for separate wheels (e.g., for both front wheels), for an example (e.g. for a rear axle), and various other combinations. For example, suspension controller 1140 can be used for setting damper rate and spring rate based on weight values 112. A lighter vehicle generally has a smaller spring and damper rate, vice versa for riding comfort. In some examples, suspension controller 1140 also receives input (e.g., acceleration/deceleration) from other systems (e.g., driver train controller 540, brake controller 840) to adjust front/rear rates independently, e.g., to reduce vehicle pitch and improve vehicle dynamics.

Suspension commands 1142 are transmitted to suspension system 1170 and used by suspension system 1170 to operate various suspension components 1172 (e.g., each damper). These suspension components 1172 are mechanically coupled to vehicle wheels 1174. In some examples, other operating instructions are stored in memory 1150. Additional features of memory 1150 and processor 1160 are described below with reference to FIG. 14.

Figure 11B:
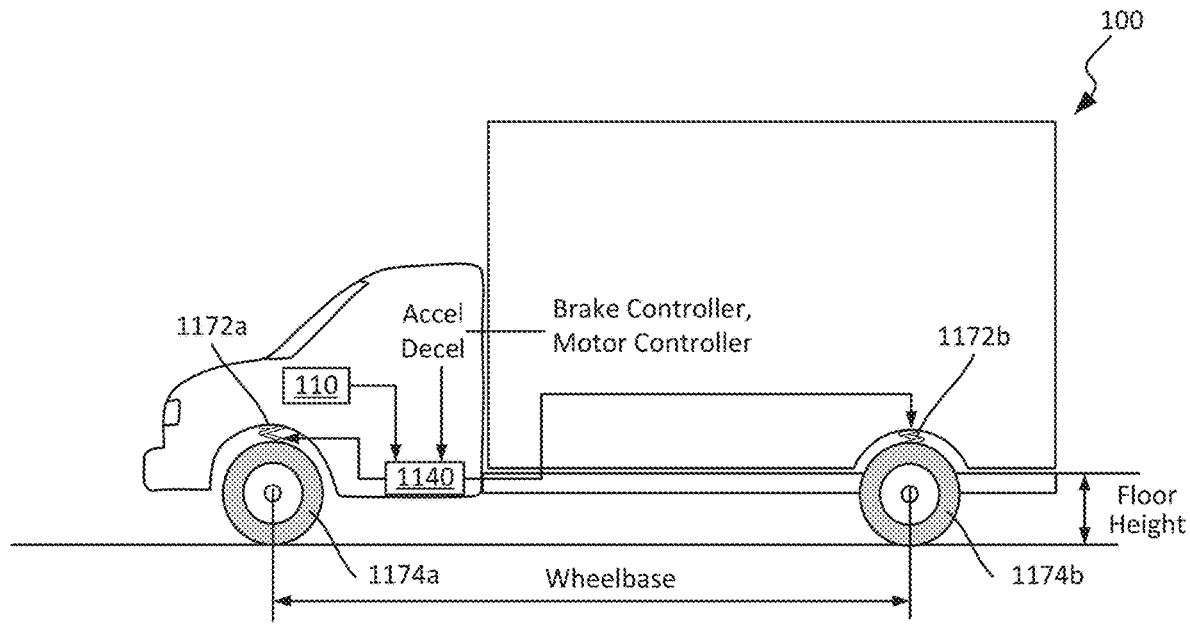
FIG. 11B is a schematic illustration of a commercial vehicle having independently controlled front and rear suspension components, in accordance with some examples.

FIG. 11B is a schematic illustration of vehicle 100 comprising front suspension component 1172a and rear suspension component 1172b, supporting the corresponding wheels of vehicle 100. As noted above, the operation of these suspension components is controlled by suspension controller 1140, which receives vehicle weight values 112 (e.g., from weight estimator 110). In some examples, the suspension components also provide response feedback to suspension controller 1140. For example, when vehicle 100 travels forward, front wheels 1174a encounter a road imperfection (e.g., a bump, pothole) first. It should be noted that in commercial vehicles, front wheels 1174a typically support less weight than rear wheels 1174b. In some examples, the portion of the total weight supported by rear wheels 1174b (which may include one or more axles) is at least about 60% or even at least about 70%. When front wheels 1174a encounter this road imperfection and move, front suspension component 1172a also reacts to the movement of front wheels 1174a. Because of the lower weight support by front wheels 1174a, the overall impact on the vehicle stability is substantially less than, e.g., when rear wheels 1174b encounter the same road imperfection.

The vehicle speed and wheelbase collectively determine the time between the front wheels encountering a road imperfection and the rear wheels encountering the same road imperfection. For example, if a vehicle travels with a speed of 50 km/h (or 13.9 m/sec) and has a wheelbase of 4.3 meters (e.g., a 170-inch wheelbase van), then this period is about 0.3 seconds. This period is larger for slower-moving vehicles and/or vehicles with longer wheelbases.

In some examples, front suspension component 1172a reports a wheel travel event (e.g., upon encountering a road imperfection) to suspension controller 1140. Suspension controller 1140 then uses this event to adjust settings of rear suspension component 1172b before rear wheels 1174b encounter the same road imperfection. As such, the overall impact on the vehicle stability is reduced by using the feedback from a suspension component connected to less-loaded wheels (e.g., front suspension component 1172a) and using this feedback to condition the remaining suspension components (e.g., rear suspension component 1172b).

Figure 11C:
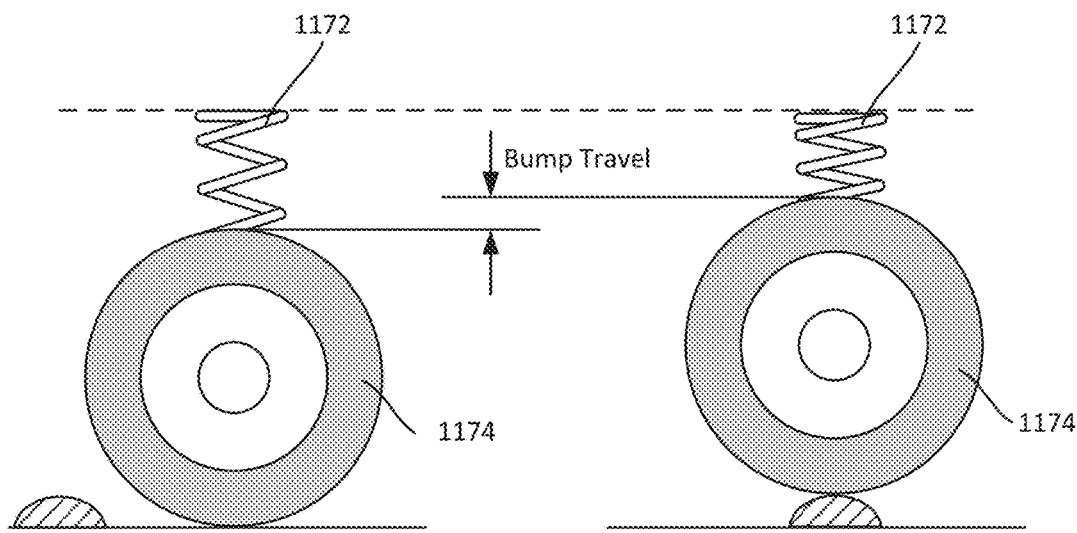
FIG. 11C is a schematic illustration of the wheel travel, in accordance with some examples.

FIG. 11C is a schematic illustration of wheel 1174 going through a bump. Suspension component 1172 supports wheel 1174 relative to a vehicle chassis (schematically identifies with a dotted line). Suspension component 1172 supports a portion of the vehicle weight and allows wheel 1174 to travel relative to the chassis (e.g., when encountering the bump). The overall wheel travel can be represented as a sum of weight-related travel and bump-related travel.

Total Wheel Travel=Weight-Related Travel+Bump-Related Travel

Weight-related travel is defined as wheel travel attributed to the weight added to the vehicle (e.g., when the vehicle is loaded). When this added weight is known (e.g., from weight values provided by weight estimator 110), the suspension component can reduce the weight travel by changing the suspension setting. Reducing the weight travel also reduces the overall wheel travel, which can be used, e.g., to reduce the cargo floor height (the distance between the cargo floor and the ground).

Figure 12:
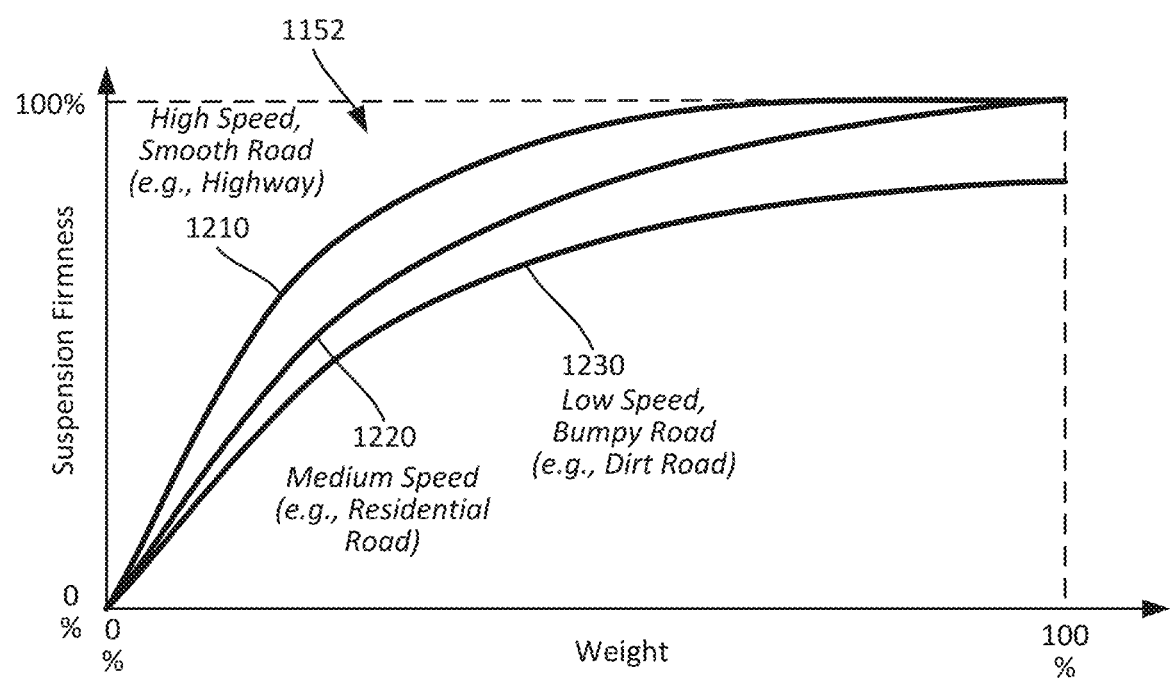
FIG. 12 is a schematic plot of a suspension map, in accordance with some examples.

FIG. 12 is an example of suspension map 1152, in which the suspension firmness is a function of the vehicle weights. In this example, suspension map 1152 has three different profiles representing different vehicle operating conditions, such as vehicle speed and road roughness. For example, line 1210 represents vehicle 100 traveling on a smooth road at a high speed (e.g., highway driving conditions), line 1220 represents vehicle 100 traveling on a road with a moderate bumpiness at a moderate speed (e.g., driving on a residential road), and line 1230 represents vehicle 100 traveling on a bumpy road at a low speed (e.g., driving on a dirt road). Highway driving requires the firmest suspension (i.e., line 1210 positioned above the other lines). Furthermore, as the vehicle's weight increases, a firmer suspension setting is needed to support all added weight. At some point, the suspension firmness can reach its limit (e.g., at 100%). It should be noted that for dirt road driving, the firmest suspension setting may never be needed (e.g., never reaching 100% even for the maximum load of vehicle 100).

Examples of Methods of Controlling Vehicle Suspension Settings

Figure 13:
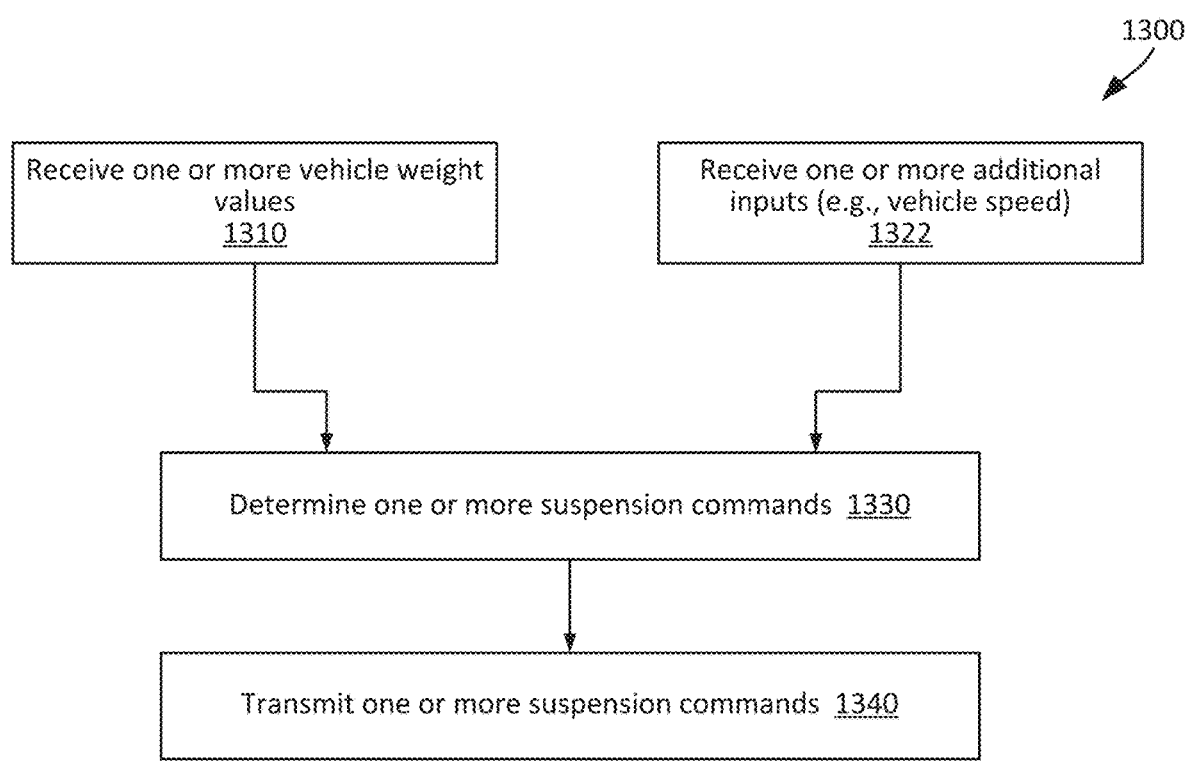
FIG. 13 is a process flowchart corresponding to a method of controlling vehicle suspension, in accordance with some examples.

FIG. 13 is a process flowchart corresponding to method 1300 of controlling the suspension settings of vehicle 100, in accordance with some examples. Various examples of vehicle 100 are described above. In general, vehicle 100 comprises suspension controller 1140 and suspension system 1170.

Method 1300 comprises receiving (block 1310) one or more vehicle weight values 112 at suspension controller 1140. For example, vehicle weight values 112 are received from weight estimator 110, e.g., automatically determining vehicle weight values 112 from various inputs provided by vehicle systems such as load cells, wheel travel sensors, bump-stop sensors, tire pressure management system, trailer hookup, and the like. Vehicle weight values 112 may include various types of weight values, e.g., a total vehicle weight, weight at each axle, and/or weight at each wheel. These types of values depend on the configuration and capabilities of weight estimator 110. In some examples, multiple vehicle weight values 112 are received, representing weights at different vehicle locations. In some examples, multiple vehicle weight values 112 are used (e.g., by weight estimator 110 and/or suspension controller 1140) to determine the vehicle center of gravity, which can then be used for determining more granular suspension commands 1142. For example, suspension commands 1142 can include lateral biasing of suspension stiffness to compensate for offset mass during roll events.

In some examples, method 1300 also comprises receiving (block 1322) one or more additional inputs 532 at suspension controller 1140. For example, one or more additional inputs 532 are selected from the group consisting of conform (e.g., provided as a driver input), vehicle configuration (e.g., vehicle height), vehicle speed, road grade, wheel-road traction, and vehicle dynamic selection. The one or more suspension commands 1142 are further determined based on one or more additional inputs 532.

Method 1300 comprises determining (block 1330) one or more suspension commands 1142 based on one or more vehicle weight values 112. Suspension commands 1142 are determined at suspension controller 1140 and using suspension map 1152. Various examples of suspension map 1152 are described above with reference to FIG. 12.

Method 1300 comprises transmitting (block 1340) one or more suspension commands 1142 from suspension controller 1140 to suspension system 1170. Suspension system 1170 uses suspension commands 1142 to operate one or more suspension components 1172 (e.g., dampers, hydraulic system, pneumatic system). In some examples, each suspension component 1172 can be responsible for a corresponding wheel and has separate individually-determined suspension commands 1142.

Computer System Examples

Figure 14:
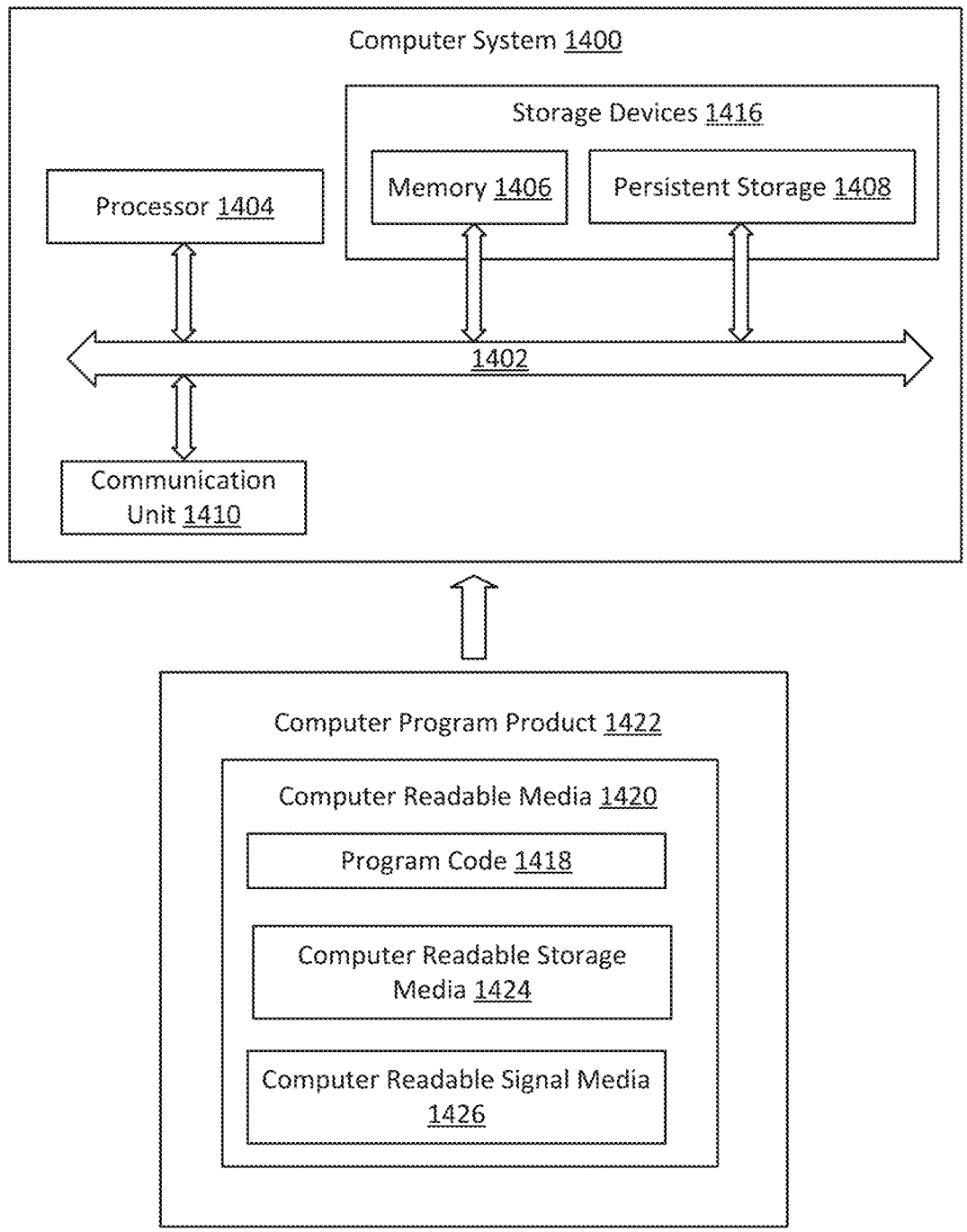
FIG. 14 is a block diagram of a computer system, operable as a weight estimator in a commercial vehicle, in accordance with some examples.

FIG. 14 is a block diagram of computer system 1400, which can be operable as weight estimator 110, drive train controller 540, brake controller 840, and/or suspension controller 1140 of vehicle 100 and is configured to perform various operations associated with these devices described above. In some examples, one or more components of computer system 1400 are implemented as onboard components of vehicle 100. In various examples, computer system 1400 includes communications framework 1402 (e.g., a bus), which provides communications between processor unit 1404, memory 1406, persistent storage 1408, and communications unit 1410. Communications unit 1410 provides for communications with other vehicle systems or devices. In these illustrative examples, communications unit 1410 may be a network interface card (e.g., a CAN-bus device), universal serial bus (USB) interface, or other suitable communications device/interface.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416, e.g., computer-readable storage components. Memory 1406 can be a random access memory (RAM) or any other suitable volatile or non-volatile storage device. Persistent storage 1408 may take various forms, e.g., a hard drive, a flash memory, or some combination of the above. Instructions for the operating system, applications, and/or programs may be located in storage devices 1416. The processes of the different examples may be performed by processor unit 1404 using computer-implemented instructions, which may be located in a memory, such as memory 1406.

These instructions are referred to as program code, computer usable program code, or computer-readable program code. The program code in the different examples may be embodied on different physical or computer-readable storage media, such as memory 1406 or persistent storage 1408. Program code 1418 is located in a functional form on computer-readable media 1420 that may be loaded onto or transferred to computer system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418.

Alternatively, program code 1418 may be transferred to computer system 1400 using computer-readable signal media 1426. Computer-readable signal media 1426 may be, for example, a propagated data signal containing program code 1418. For example, computer-readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

What is claimed is:

1. A method of operating a commercial vehicle comprising a drive train controller, a drive train, a suspension controller, and a suspension system, the method comprising:
    receiving, at a weight estimator, a wheel travel value and multiple inputs selected from the group consisting of a bump stop output, a speed value, a power train data, a trailer presence data, and a tire pressure value;
    determining, using the weight estimator and independently from each other, multiple preliminary vehicle weight values, wherein each of the multiple preliminary vehicle weight values is determined using at least two of the multiple inputs;
    comparing the multiple preliminary vehicle weight values to each other and to a set range and, for each one of the multiple preliminary vehicle weight values and based on the comparing, either combining the one of the multiple preliminary vehicle weight values with one or more other ones of the multiple preliminary vehicle weight values or ignoring the one of the multiple preliminary vehicle weight values, thereby generating one or more vehicle weight values at the drive train controller and the suspension controller;
    receiving a throttle pedal position at the drive train controller;
    determining one or more torque commands based on the one or more vehicle weight values and the throttle pedal position, wherein:
        the one or more torque commands are determined at the drive train controller and using a combination of throttle maps comprising a throttle map for vehicle weight values and a throttle map for vehicle speed, and
        different throttle maps have different coefficients assigned indicating a relative importance of each throttle map to the determined torque command;
        transmitting the one or more torque commands from the drive train controller to the drive train determining one or more suspension settings based on the one or more vehicle weight values at the suspension controller and using a suspension map; and
        transmitting the one or more suspension settings from the suspension controller to the suspension system, thereby adjusting weight travel.

2. The method of claim 1, further comprising receiving one or more additional inputs at the drive train controller, wherein:
    the one or more additional inputs are selected from the group consisting of vehicle speed, road grade, wheel-road traction, and vehicle dynamic selection; and
    the one or more torque commands are further determined based on the one or more additional inputs.

3. The method of claim 1, wherein determining the multiple preliminary vehicle weight values is performed using one or more correlation techniques of weight values and input values.

4. The method of claim 1, wherein determining each of the multiple preliminary vehicle weight values is performed using multiple ones of the multiple inputs.

5. The method of claim 1, further comprising:
    determining a target acceleration based on the throttle pedal position;
    receiving a measured acceleration; and
    comparing the target acceleration with the measured acceleration to determine an acceleration difference, wherein the one or more torque commands are further determined based on the acceleration difference.

6. The method of claim 5, wherein the target acceleration is offset by a power train response delay when compared with the measured acceleration.

7. The method of claim 1, wherein the one or more vehicle weight values comprise multiple weight values, representing weight distribution at different locations of the vehicle.

8. The method of claim 1, wherein the one or more torque commands comprise multiple torque commands, each corresponding to a different driver motor of the drive train.

9. The method of claim 1, further comprising:
receiving the one or more vehicle weight values at a braking controller of the commercial vehicle;
receiving a brake pedal position at the braking controller;
determining brake commands based on the one or more vehicle weight values and the brake pedal position, wherein the brake commands are determined at the braking controller and using a brake map; and
transmitting the brake commands from the braking controller to brakes of the commercial vehicle.

10. The method of claim 9, further comprising determining one or more regenerative commands based on the one or more vehicle weight values and the brake pedal position.

11. The method of claim 10, wherein the brake commands are determined at least in part based on the regenerative commands.

12. The method of claim 9, further comprising receiving one or more additional inputs at the brake controller, wherein:
the one or more additional inputs are selected from the group consisting of vehicle speed, road grade, wheel-road traction, and vehicle dynamic selection; and
the brake commands are further determined based on the one or more additional inputs.

13. The method of claim 9, further comprising:
determining a target deceleration based on the brake pedal position;
receiving a measured deceleration; and
comparing the target deceleration with the measured deceleration to determine a deceleration difference, wherein the brake commands are further determined based on the deceleration difference.

14. The method of claim 9, wherein the one or more vehicle weight values comprise multiple weight values, representing weight distribution at different locations of the vehicle.

15. The method of claim 1, wherein comparing the multiple preliminary vehicle weight values to each other and to the set range is based on whether the commercial vehicle is in motion or stationary.

16. The method of claim 1, wherein:
the multiple inputs received at the weight estimator comprise one or more external weight inputs, and
the one or more external weight inputs are used for calibrating the weight estimator.

17. The method of claim 1, further comprising:
transmitting the one or more vehicle weight values to a load analyzer; and
determining load distribution on the commercial vehicle using the load analyzer based on the one or more vehicle weight values.

18. The method of claim 1, wherein further comprising:
transmitting the one or more vehicle weight values to a maintenance scheduler; and
determining a maintenance schedule for the commercial vehicle using the maintenance scheduler based on the one or more vehicle weight values.

19. The method of claim 18, wherein the maintenance schedule for the commercial vehicle is further determined, using the maintenance scheduler, based on acceleration input, in addition to the one or more vehicle weight values.

20. The method of claim 18, wherein the maintenance schedule for the commercial vehicle is further determined, using the maintenance scheduler, based on one or more of distance travelled and fuel consumed, in addition to the one or more vehicle weight values.

* * * * *